(12) United States Patent
Shoval et al.

(10) Patent No.: US 11,574,263 B2
(45) Date of Patent: Feb. 7, 2023

(54) SYSTEM AND METHOD FOR PROVIDING MULTIPLE TRANSPORTATION PROPOSALS TO A USER

(71) Applicant: VIA TRANSPORTATION, INC., New York, NY (US)

(72) Inventors: Oren Shoval, Jerusalem (IL); Daniel Ramot, New York, NY (US)

(73) Assignee: VIA TRANSPORTATION, INC., New York, NY (US)

( * ) Notice: Subject to any disclaimer, the term of this patent is extended or adjusted under 35 U.S.C. 154(b) by 0 days.

(21) Appl. No.: 15/629,919

(22) Filed: Jun. 22, 2017

(65) Prior Publication Data

US 2017/0300848 A1 Oct. 19, 2017

Related U.S. Application Data

(63) Continuation of application No. 14/218,348, filed on Mar. 18, 2014, now abandoned.
(Continued)

(51) Int. Cl.
*G06Q 10/06* (2012.01)
*G01C 21/34* (2006.01)
(Continued)

(52) U.S. Cl.
CPC . *G06Q 10/063114* (2013.01); *G01C 21/3438* (2013.01); *G01C 21/3492* (2013.01);
(Continued)

(58) Field of Classification Search
None
See application file for complete search history.

(56) References Cited

U.S. PATENT DOCUMENTS

| | | |
|---|---|---|
| 4,212,069 A | 7/1980 | Baumann |
| 4,502,123 A | 2/1985 | Minami et al. |

(Continued)

FOREIGN PATENT DOCUMENTS

| | | |
|---|---|---|
| CN | 103198647 | 7/2013 |
| CN | 103279669 | 9/2013 |

(Continued)

OTHER PUBLICATIONS

Agatz, Niels, et al. "Sustainable passenger transportation: Dynamic ride-sharing." (2010) (Year: 2010).*

(Continued)

*Primary Examiner* — Darlene Garcia-Guerra
(74) *Attorney, Agent, or Firm* — Pearl Cohen Zedek Latzer Baratz LLP

(57) ABSTRACT

A computer-implemented method that, in an embodiment, includes receiving a travel request from a traveler that includes a pickup and destination location and a number of travelers and analyzing the travel request and calculating routes for vehicles that are partially based on the pickup and destination location, the number of travelers, destination locations of travelers located in the vehicles, traffic conditions, minimizing a waiting time for the traveler, minimizing a travel time for the traveler, minimizing a travel time for the travelers located in the vehicles, and optimizing an aggregation of travelers on each of the plurality vehicles. In an embodiment, the plurality of vehicles includes 5 vehicles or more and based on the calculating, the method includes supplying a selected route to a selected vehicle and supplying to the traveler, identification information related to the selected vehicle thereby resulting in transportation of the traveler to the destination location.

21 Claims, 12 Drawing Sheets

Related U.S. Application Data

(60) Provisional application No. 61/790,897, filed on Mar. 15, 2013.

(51) Int. Cl.
  *G01C 21/36* (2006.01)
  *G06Q 30/06* (2012.01)
  *G06Q 50/30* (2012.01)

(52) U.S. Cl.
  CPC ... *G01C 21/3626* (2013.01); *G06Q 10/06315* (2013.01); *G06Q 10/063118* (2013.01); *G06Q 30/0611* (2013.01); *G06Q 50/30* (2013.01)

(56) References Cited

U.S. PATENT DOCUMENTS

| | | | |
|---|---|---|---|
| 4,528,679 A | 7/1985 | Shahbaz | |
| 5,897,629 A * | 4/1999 | Shinagawa | G06N 3/126 706/13 |
| 6,459,986 B1 | 10/2002 | Boyce | |
| 7,136,747 B2 | 11/2006 | Raney | |
| 7,146,270 B2 | 12/2006 | Nozaki | |
| 8,082,095 B2 | 12/2011 | Sumcad et al. | |
| 8,520,695 B1 * | 8/2013 | Rubin | G08G 9/02 370/337 |
| 8,688,532 B2 | 4/2014 | Khunger et al. | |
| 8,799,038 B2 * | 8/2014 | Chen | G06Q 10/06 705/5 |
| 8,868,529 B2 | 10/2014 | Lerenc | |
| 9,068,851 B2 | 6/2015 | Lerenc | |
| 9,074,904 B1 | 7/2015 | Huang et al. | |
| 9,094,824 B2 | 7/2015 | Jayanthi | |
| 9,293,048 B2 | 3/2016 | Fowler | |
| 9,304,009 B2 | 4/2016 | Beaurepaire et al. | |
| 9,322,661 B2 | 4/2016 | Wechsler | |
| 9,494,439 B1 | 11/2016 | Ross et al. | |
| 9,562,785 B1 | 2/2017 | Racah et al. | |
| 9,599,481 B2 | 3/2017 | Lord et al. | |
| 9,679,489 B2 | 6/2017 | Lambert | |
| 9,689,694 B2 | 6/2017 | Lord | |
| 9,706,367 B2 | 7/2017 | Tao | |
| 9,720,415 B2 | 8/2017 | Levinson | |
| 9,903,721 B2 | 2/2018 | Choi | |
| 9,939,279 B2 | 4/2018 | Pan | |
| 10,156,848 B1 | 12/2018 | Konrardy et al. | |
| 10,467,554 B2 * | 11/2019 | Yoo | H04W 4/024 |
| 10,648,822 B2 | 5/2020 | Newlin | |
| 10,762,447 B2 | 9/2020 | Kislovskiy | |
| 2001/0037174 A1 | 11/2001 | Dickerson | |
| 2002/0011940 A1 * | 1/2002 | Cappel | G06Q 10/047 340/994 |
| 2003/0177020 A1 | 9/2003 | Okamura | |
| 2004/0076280 A1 * | 4/2004 | Ando | G08G 1/202 379/220.01 |
| 2004/0088392 A1 * | 5/2004 | Barrett | G01C 21/26 709/223 |
| 2004/0093280 A1 | 5/2004 | Yamaguchi | |
| 2004/0158483 A1 * | 8/2004 | Lecouturier | G06Q 10/025 705/6 |
| 2004/0215382 A1 | 10/2004 | Breed | |
| 2005/0021227 A1 | 1/2005 | Matsumoto | |
| 2005/0280555 A1 * | 12/2005 | Warner | G08G 1/14 705/13 |
| 2006/0059023 A1 | 3/2006 | Mashinsky | |
| 2006/0106655 A1 | 5/2006 | Lettovsky et al. | |
| 2006/0178949 A1 * | 8/2006 | McGrath | G06Q 30/02 705/26.1 |
| 2006/0208169 A1 | 9/2006 | Breed | |
| 2006/0276960 A1 * | 12/2006 | Adamczyk | G06Q 10/06 701/516 |
| 2007/0052586 A1 | 3/2007 | Horstemeyer | |
| 2007/0164726 A1 | 7/2007 | De Marcken et al. | |
| 2007/0168239 A1 | 7/2007 | Marcken et al. | |
| 2007/0248220 A1 | 10/2007 | Crandell | |
| 2008/0015923 A1 * | 1/2008 | Masaba | G06Q 10/06311 705/7.13 |
| 2008/0027772 A1 | 1/2008 | Gernega et al. | |
| 2008/0162036 A1 | 7/2008 | Breed | |
| 2008/0189207 A1 * | 8/2008 | Wurster | G06Q 10/02 705/40 |
| 2008/0195428 A1 * | 8/2008 | O'Sullivan | G06Q 10/025 705/6 |
| 2008/0270204 A1 | 10/2008 | Poykko | |
| 2008/0277183 A1 * | 11/2008 | Huang | G06Q 30/08 340/5.52 |
| 2009/0005963 A1 | 1/2009 | Jarvinen | |
| 2009/0049044 A1 | 2/2009 | Mitchell | |
| 2009/0083111 A1 * | 3/2009 | Carr | G06Q 10/047 705/7.13 |
| 2009/0177502 A1 | 7/2009 | Doinoff | |
| 2009/0192851 A1 * | 7/2009 | Bishop | G06Q 10/08 705/26.3 |
| 2009/0210276 A1 | 8/2009 | Krumm et al. | |
| 2009/0216600 A1 * | 8/2009 | Hill | G06Q 10/06 705/7.14 |
| 2009/0248587 A1 * | 10/2009 | Van Buskirk | G06Q 10/06 705/80 |
| 2009/0271227 A1 | 10/2009 | Hayat | |
| 2009/0327011 A1 | 12/2009 | Petroff | |
| 2010/0030594 A1 | 2/2010 | Swart | |
| 2010/0052945 A1 | 3/2010 | Breed | |
| 2010/0280884 A1 * | 11/2010 | Levine | G01C 21/3438 705/13 |
| 2010/0299177 A1 | 11/2010 | Buczkowski et al. | |
| 2011/0099040 A1 * | 4/2011 | Felt | G06Q 50/30 705/7.12 |
| 2011/0130916 A1 | 6/2011 | Mayer | |
| 2011/0153629 A1 * | 6/2011 | Lehmann | G06Q 30/06 707/758 |
| 2011/0191017 A1 | 8/2011 | Certin | |
| 2011/0195699 A1 | 8/2011 | Tadayon | |
| 2011/0213629 A1 * | 9/2011 | Clark | G06Q 10/02 705/5 |
| 2011/0238457 A1 | 9/2011 | Mason | |
| 2011/0301985 A1 | 12/2011 | Camp et al. | |
| 2012/0010912 A1 | 1/2012 | Lele | |
| 2012/0041675 A1 * | 2/2012 | Juliver | G06Q 10/08 701/465 |
| 2012/0078672 A1 * | 3/2012 | Mohebbi | G06Q 10/0631 705/7.12 |
| 2012/0109721 A1 * | 5/2012 | Cebon | G06Q 30/06 705/13 |
| 2012/0232943 A1 | 9/2012 | Myr | |
| 2012/0239452 A1 * | 9/2012 | Trivedi | G06Q 10/00 705/7.22 |
| 2012/0290652 A1 * | 11/2012 | Boskovic | G06Q 10/02 709/204 |
| 2013/0006464 A1 | 1/2013 | Speiser | |
| 2013/0046586 A1 | 2/2013 | Lerner et al. | |
| 2013/0054281 A1 | 2/2013 | Thakkar et al. | |
| 2013/0060468 A1 * | 3/2013 | Delling | G06Q 10/047 701/527 |
| 2013/0060586 A1 | 3/2013 | Chen | |
| 2013/0073327 A1 * | 3/2013 | Edelberg | G06Q 10/047 705/7.13 |
| 2013/0096827 A1 | 4/2013 | McCall et al. | |
| 2013/0102333 A1 | 4/2013 | Dam | |
| 2013/0110385 A1 | 5/2013 | Heed et al. | |
| 2013/0132140 A1 * | 5/2013 | Amin | G06Q 10/063 705/7.13 |
| 2013/0132369 A1 | 5/2013 | Delling et al. | |
| 2013/0158861 A1 | 6/2013 | Lerenc | |
| 2013/0159028 A1 | 6/2013 | Lerenc et al. | |
| 2013/0179205 A1 | 7/2013 | Slinin | |
| 2013/0218455 A1 | 8/2013 | Clark | |
| 2013/0231965 A1 * | 9/2013 | Tokatly | G06Q 10/02 705/5 |
| 2013/0238167 A1 | 9/2013 | Stanfield et al. | |
| 2014/0011522 A1 | 1/2014 | Lin et al. | |
| 2014/0052481 A1 | 2/2014 | Monteil | |
| 2014/0074757 A1 | 3/2014 | De Gennaro et al. | |

(56) References Cited

U.S. PATENT DOCUMENTS

| | | | |
|---|---|---|---|
| 2014/0082069 A1* | 3/2014 | Varoglu | G06Q 50/01 709/204 |
| 2014/0129302 A1 | 5/2014 | Amin | |
| 2014/0129951 A1* | 5/2014 | Amin | G06Q 50/30 715/738 |
| 2014/0172727 A1 | 6/2014 | Abhyanker | |
| 2014/0173511 A1 | 6/2014 | Lehmann et al. | |
| 2014/0180773 A1 | 6/2014 | Zafiroglu et al. | |
| 2014/0188775 A1 | 7/2014 | Lehmann | |
| 2014/0214322 A1 | 7/2014 | Tsimhoni | |
| 2014/0229255 A1* | 8/2014 | Scofield | G06Q 30/0207 705/14.21 |
| 2014/0323167 A1 | 10/2014 | Spearritt | |
| 2014/0324505 A1 | 10/2014 | Lerenc et al. | |
| 2014/0365250 A1 | 12/2014 | Ikeda | |
| 2015/0006072 A1 | 1/2015 | Goldberg | |
| 2015/0095122 A1 | 4/2015 | Eramian | |
| 2015/0100238 A1 | 4/2015 | Cai et al. | |
| 2015/0112585 A1 | 4/2015 | Knepper | |
| 2015/0161554 A1 | 6/2015 | Sweeney et al. | |
| 2015/0161564 A1 | 6/2015 | Sweeney | |
| 2015/0204684 A1 | 7/2015 | Rostamian et al. | |
| 2015/0206437 A1 | 7/2015 | Fowler | |
| 2015/0219464 A1 | 8/2015 | Beaurepaire et al. | |
| 2015/0242944 A1 | 8/2015 | Willard | |
| 2015/0248689 A1 | 9/2015 | Paul | |
| 2015/0294430 A1 | 10/2015 | Huang | |
| 2015/0310378 A1 | 10/2015 | van der Berg | |
| 2015/0310379 A1 | 10/2015 | Farrelly et al. | |
| 2015/0324718 A1 | 11/2015 | Lord | |
| 2015/0324945 A1 | 11/2015 | Lord et al. | |
| 2015/0345951 A1 | 12/2015 | Dutta et al. | |
| 2016/0021154 A1 | 1/2016 | Schoeffler | |
| 2016/0027306 A1 | 1/2016 | Lambert | |
| 2016/0027307 A1 | 1/2016 | Abhyanker | |
| 2016/0034845 A1 | 2/2016 | Hiyama | |
| 2016/0171574 A1 | 6/2016 | Paulucci | |
| 2016/0209220 A1 | 7/2016 | Laetz | |
| 2016/0210675 A1 | 7/2016 | Smart | |
| 2016/0231128 A1 | 8/2016 | Marks | |
| 2016/0253599 A1 | 9/2016 | Lang | |
| 2016/0320194 A1 | 11/2016 | Liu et al. | |
| 2016/0321771 A1 | 11/2016 | Liu et al. | |
| 2016/0335576 A1 | 11/2016 | Peng | |
| 2016/0356615 A1 | 12/2016 | Arata | |
| 2016/0361970 A1 | 12/2016 | Pebbles | |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1 | 12/2016 | Cao | |
| 2017/0059334 A1 | 3/2017 | Mukherjee | |
| 2017/0138749 A1 | 5/2017 | Pan | |
| 2017/0167882 A1 | 6/2017 | Ulloa Paredes et al. | |
| 2017/0169366 A1 | 6/2017 | Klein | |
| 2017/0185948 A1 | 6/2017 | Magazinik | |
| 2017/0153714 A1 | 8/2017 | Gao et al. | |
| 2017/0243492 A1 | 8/2017 | Lambert et al. | |
| 2017/0248963 A1 | 8/2017 | Levinson et al. | |
| 2017/0284819 A1 | 10/2017 | Donnelly | |
| 2017/0300053 A1 | 10/2017 | Wengreen et al. | |
| 2017/0301054 A1 | 10/2017 | Sangoi et al. | |
| 2017/0313208 A1 | 11/2017 | Lindsay | |
| 2017/0365030 A1 | 12/2017 | Shoham et al. | |
| 2018/0046944 A1 | 2/2018 | Barbera | |
| 2018/0073882 A1 | 3/2018 | North | |
| 2018/0080263 A1 | 3/2018 | Rose | |
| 2018/0087915 A1 | 3/2018 | Marco | |
| 2018/0091604 A1 | 3/2018 | Yamashita | |
| 2018/0121847 A1 | 5/2018 | Zhao | |
| 2018/0189682 A1 | 7/2018 | Seacat | |
| 2018/0191863 A1 | 7/2018 | Matthieson et al. | |
| 2018/0197418 A1 | 7/2018 | Chu | |
| 2018/0224866 A1 | 8/2018 | Alonso-mora | |
| 2018/0231984 A1 | 8/2018 | Alonso-mora | |
| 2018/0260787 A1 | 9/2018 | Xi | |
| 2018/0290610 A1 | 10/2018 | Zych | |
| 2018/0338225 A1 | 11/2018 | Shimizu | |
| 2018/0340790 A1 | 11/2018 | Kislovskiy et al. | |
| 2018/0342035 A1 | 11/2018 | Sweeney | |
| 2018/0348772 A1 | 12/2018 | Stefan | |
| 2018/0356239 A1 | 12/2018 | Marco | |
| 2019/0086221 A1 | 3/2019 | Thiyagarajan | |
| 2019/0114638 A1 | 4/2019 | Flores | |
| 2019/0122561 A1 | 4/2019 | Shimizu | |
| 2019/0171943 A1 | 6/2019 | Pao et al. | |
| 2019/0205842 A1 | 7/2019 | Starns | |
| 2019/0206258 A1 | 7/2019 | Chang et al. | |
| 2019/0259182 A1 | 8/2019 | Sarukkai et al. | |
| 2019/0271552 A1 | 9/2019 | Choi et al. | |
| 2019/0311307 A1 | 10/2019 | Ramot | |
| 2020/0104965 A1 | 4/2020 | Ramot | |
| 2020/0160476 A1 | 5/2020 | Ramot | |
| 2020/0160477 A1 | 5/2020 | Ramot | |
| 2020/0160478 A1 | 5/2020 | Ramot | |
| 2020/0160705 A1 | 5/2020 | Chase | |
| 2020/0160709 A1 | 5/2020 | Ramot | |
| 2020/0333146 A1 | 10/2020 | Shoval | |
| 2020/0334987 A1 | 10/2020 | Shoval | |
| 2020/0361406 A1 | 11/2020 | Zych | |
| 2021/0073825 A1 | 3/2021 | Walling | |

FOREIGN PATENT DOCUMENTS

| | | |
|---|---|---|
| CN | 103327440 | 9/2013 |
| CN | 104751625 | 7/2015 |
| EP | 2605149 | 6/2013 |
| EP | 2665050 | 11/2013 |
| EP | 2792538 | 10/2014 |
| EP | 3472563 | 4/2019 |
| EP | 3574459 | 12/2019 |
| EP | 3631707 | 4/2020 |
| EP | 3659078 | 6/2020 |
| EP | 3738085 | 11/2020 |
| EP | 3776395 | 2/2021 |
| GB | 2 397 683 | 7/2004 |
| JP | 2003006294 | 1/2003 |
| JP | 2003233656 | 8/2003 |
| JP | 2003271706 | 9/2003 |
| JP | 2003281422 | 10/2003 |
| JP | 2004062490 | 2/2004 |
| JP | 2004192366 | 7/2004 |
| JP | 2004362271 | 12/2004 |
| JP | 2010231258 | 10/2010 |
| JP | 2011214930 | 10/2011 |
| JP | 2019525299 | 9/2019 |
| JP | 2020522789 | 7/2020 |
| KR | 20090044693 | 5/2009 |
| KR | 20100053717 | 5/2010 |
| KR | 101752159 | 6/2017 |
| SG | 2012065264 | 4/2014 |
| WO | WO2006128946 | 12/2006 |
| WO | WO 2012/143300 | 10/2012 |
| WO | WO 2012143300 | 10/2012 |
| WO | WO2014106617 | 7/2014 |
| WO | WO2016209595 | 12/2016 |
| WO | WO2017223031 | 12/2017 |
| WO | WO2018140505 | 8/2018 |
| WO | WO2018217640 | 11/2018 |
| WO | WO2019023324 | 1/2019 |
| WO | WO2019136341 | 7/2019 |
| WO | WO2019199766 | 10/2019 |

OTHER PUBLICATIONS

Agatz, Niels, et al. "Optimization for dynamic ride-sharing: A review." European Journal of Operational Research 223.2 (2012): 295-303 (Year: 2012).*

Office Action dated Oct. 27, 2017, in U.S. Appl. No. 15/629,986.

Office Action dated May 11, 2018, in U.S. Appl. No. 15/629,986.

Ma, Shuo et al. T-Share: A large scale dynamic taxi ridesharing service, 2013, IEEE, Proceedings of the 29th International Conference on Data Engineering (ICDC0, 2016, pp. 410-421 (year 2013).

(56) References Cited

OTHER PUBLICATIONS

Wen He; Kai Hwang; Deyi Li, Intelligent carpool routing for urban ridesharing by mining GPS trajectories, IEEE Transactions on intelligent transportation systems; year 2014, vol. 15, issue 5, pp. 2286-2296; DOI 10.1109/TITS.2014.2315521.
Dejan Dimitrijevic, Nernanja Nedjc, Vladimir Dimitrieski, Real-time carpooling and ride-sharing: Position paper design concepts, distribution and cloud computing strategies; Computer Science and Information Systems (FedCSIS) 2013 Federated Conference on year 2013, pp. 781-786; Referenced in IEEE Conference Publications.
Harini Sirisena, Ride Buddies-Multi agent system for ride sharing/carpooling; Advances in ICT for Emerging Regions (ICTer) 2014 International Conference year 2014; pp. 252-252, DOI:10.1109/ICTER.2014.7083910: Referenced IEEE Conference Publications.
Chung-Min Chen, David Shallcross, Yunng-Chien Shih. Yen-Ching Wu, Sheng-Po Kou, Yuan-Ying Hsi, Yuhsiang Holderby, William Chou, Smart ride share with flexible route matching: Chung-Min Chen, David Shallcross, Advanced Communication Technology (ICACT) 2011, 13th International Conference, pp. 1506-1510.
Nianbo Liu; Ming Liu; Jiannong Cao; Guihai Chen; Wei Lou, When transportation meets communication: V2P over VANETs; Distributed Computing Systems (ICDCS) 2010 IEEE 30th International Conference year 2010, pp. 567-576, DOI:10.1109/ICDCS.2010.83.
Li et al., A dynamic pricing method for carpooling service based on coalition at game analysis; 2016 IEEE 18th Intern Conf on High Performance Computing and Comm; IEEE 14th Intern Conf on Smart City IEEE 2nd Intern Conf on Data Science and Systems (hpcc/SmartCity/dss 9HPCC/Smartcity/DSS) year 2016 pp. 78-85; DOI:10.1109/HPCC-Smart City-DSS) year 2016, pp. 78-85, DOI:10.1109/HPCC-SmartCity-DSS.2016.0022.
Lasse Korsholm Poulsen, Daan Dekkers, Nicolaas Wagenaar; Wesley Snijders; Ben Lewinsky; Raghava Rao Mukkamala; Ravi Valrapu; Green cabs vs. Uber in New York City, 2016 IEEE international Congress on Big Data (BigDataCongress) Year 2016:pp. 222-229, DOI: 10.1109/BigDataCongress.2016.35.
Hawkins, Andrew, Uberhop is Uber's Latest idea for killing mass transit, Dec. 8, 2015, The Verge, p. 1-4.
Alonso-Mora, Javier et al. "On-Demand High-Capacity Ride-Sharing via Dynamic Trip-Vehicle Assignment." Proceedings of the National Academy of Sciences 114, 3 (Jan. 2017): 462-467 © 2017 National Academy of Sciences.
Mora, Supplemental Material—On Demand high-capacity ridesharing via dynamic tripvehicle assignment, Jul. 20, 2016, p. 1-36.
Whitney, Alyse, I took Via to work every day for a month. Here's what I learned, May 10, 2016, p. 1-3.
Y. Hou, W. Zhong, L. Su, K. Hulme, A. W. Sadek and Qiao, "TASeT: Improving the Efficiency of Electric Taxis With Transfer-Allows Rideshare", in IEEE Transactions on Vehicular Technology, vol. 56., No. 12, pp. 9518-9528, Dec. 2016, doi:10.1109//TVT.2016.2592983. (Year 2016).
Office Action for European Appl. No. 18731617.9 dated Jan. 25, 2022.
Office Action for U.S. Appl. No. 16/752,381 dated Apr. 14, 2022.
Office Action for European Appl. No. 19702319.5 dated Jan. 25, 2022.
Office Action for European Appl. No. 18758779.5 dated Nov. 8, 2021.
Office Action for European Appl. No. 19702319.5 dated Oct. 26, 2021.
Office Action for European Appl. No. 18703675.1 dated Oct. 8, 2021.
Office Action for Japanese Appl. No. 2019-564501 dated Jan. 27, 2021.
Office Action for U.S. Appl. No. 16/752,281 dated Apr. 14, 2022.
Office Action for U.S. Appl. No. 16/921,257 dated Mar. 31, 2022.
Notice of Allowance for U.S. Appl. No. 16/750,679 dated May 3, 2021.
Office Action for U.S. Appl. No. 15/916,373 dated Dec. 16, 2020.
Office Action for U.S. Appl. No. 16/751,321 dated May 17, 2022.
Office Action for U.S. Appl. No. 16/920,012 dated Jun. 6, 2022.
Ridesharing in North America: Past, Present, and Future, Nelson D. Chan and Susan Shaheen, published in Transport Reviews, vol. 32, No. 1, 93-112, Jan. 2012.
Los Angeles Smart Traveler Field Operational Test Evaluation, Genevieve Giuliano, Randolph W. Hall, and Jacqueline M. Golob, University of Southern California, California PATH Research Report UCB-ITS-PRR-95-41, Dec. 1995.
Seattle Smart Traveler, Daniel J. Dailey, Donald Loseff, David Meyers, Final Research Report, Washington State Transportation Center (TRAC), Oct. 1997, 1-32.
Dynamic Taxi-sharing Service Using Intelligent Transportation System Technologies, Chi-Chung Tao, IEEE, 3209-3212, 2007.
A Survey of Mobile Phone Sensing, Nicholas D. Lane, Emiliano Miluzzo, Hong Lu, Daniel Peebles, Tanzeem Choudhury, and Andrew T. Campbell, IEEE Communications Magazine, 140-150, Sep. 2010.
The Research and Implementation of GPS Intelligent Transmission Strategy Based on on-board Android Smartphones, Zhiqiang Wei, Yaqing Song, Hao Liu, Yanxiu Sheng, and Xi Wang, IEEE, 1230-1233, 2013.
Smarter transportation case study #10: Dynamic Ridesharing in Cork., Transportation for America, https://web.archive.org/web/20111007214904/http://t4america.org/blog/2...ter-transportation-case-study-10-dynamic-ridesharing in-cork-ireland/, Crawled 2011, Retrieved Nov. 15, 2021.
Avego Real-Time Ridesharing, Avego Ltd., https://web.archive.org/web/20111021225957/http://www.avego.com:80/st/realtime.php , Crawled 2011, Retrieved Nov. 15, 2021.
Avego Introduction, Avego Ltd., https://web.archive.org/web/20111102165609/http://www.avego.com:80/st/index.php, Crawled 2011, Retrieved Nov. 15, 2021.
Understanding the NAVSTAR GPS, GIS, and IVHS 2nd Edition, Tom Logsdon, Van Nostrand Reinhold, 1995.
Behind the Success of the CVCC Engine, Honda Worldwide, https://web.archive.org/web/20070219081359/http://world.honda.com/history/challenge/1981navigationsystem/text/01.hml, Crawled 2007, Retrieved Dec. 13, 2021.
The Final Test: From Suzuka to Tokyo, Honda Worldwide, https://web.archive.org/web/20070201131328/http://world.honda.com/history/challenge/1981navigationsystem/text/06.html, Crawled 2007, Retrieved Dec. 13, 2021.
Creating a Progressive Strategy, Honda Worldwide, https://web.archive.org/web/20070221131445/http://world.honda.com/history/challenge/1981navigationsystem/text/02.html, Crawled 2007, Retrieved Dec. 13, 2021.
Map Navigation Software of the Electro-Multivision of the '91 Toyota Soarer, Kunihiro Ishikawa, Michima Ogawa, Shiegtoshi Azuma, and Tooru Ito, IEEE Vehicle Navigation and Information Systems Conference, 463-473, 1991.
Automobile Navigation: Where is it Going?, Robert L. French, IEEE Aerospace and Electronic Systems Magazine, vol. 2, Issue: 5, May 6-12, 1987.
TravTek Global Evaluation and Executive Summary, V.W. Imnan and J.I. Peters, U.S. Department of Transportation Federal Highway Administration, Pub. No. FHWA-RD-96-031, Mar. 1996.
TravTek System Architecture Evaluation, C. Blumentritt, K. Balke, E. Symour, and R. Sanchez, U.S. Department of Transportation Federal Highway Administration, Pub. No. FHWARD-94-141, Jul. 1995.
Historical overview of automobile navigation technology, Robert L. French, 36th IEEE Vehicular Technology Conference, 1986.
The Dynamic Traffic Information Collection and Processing Methods of ITS Common Information Platform Based on Floating Car Technology, Haowei Su and Wei Zhang, IEEE 2008 International Seminar on Future BioMedical Information Engineering, 156-159, 2008.
Furuhata, et al., Ridesharing: The state-of-the-art and future directions, Transportation Research Part B 57 (2013) 28-46U.
Gruebele, P. Interactive system for real time dynamic multi-hop carpooling, Global Transport Knowledge Partnership, 2008:1-17.
Office Action for U.S. Appl. No. 17/856,393 dated Sep. 12, 2022.

\* cited by examiner

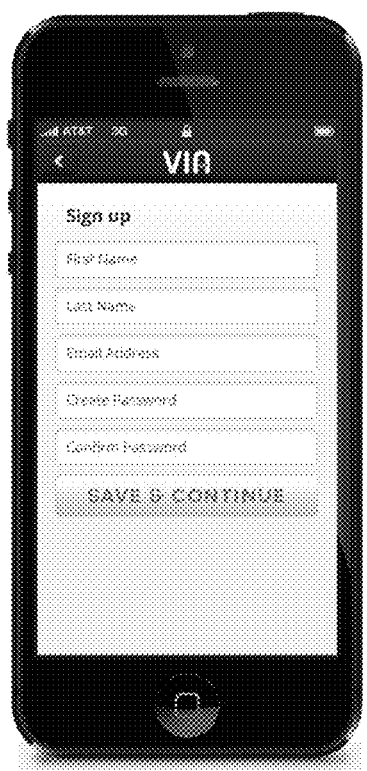
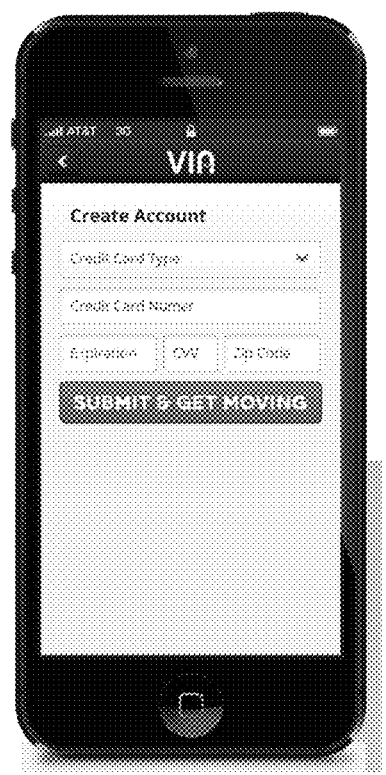
FIGURE 6A  FIGURE 6B  FIGURE 6C

SYSTEM AND METHOD FOR PROVIDING MULTIPLE TRANSPORTATION PROPOSALS TO A USER

RELATED APPLICATIONS

This is a continuation of U.S. application Ser. No. 14/218,348, filed Mar. 18, 2014, which claims the benefit of U.S. Provisional Application No. 61/790,897, filed Mar. 15, 2013, all of which are incorporated herein by reference in their entirety.

TECHNICAL FIELD

The system and method relate to transportation solutions.

BACKGROUND

Methods and systems for managing transportation needs of travelers are known.

SUMMARY OF INVENTION

In some embodiments, the method includes a computer-implemented method that includes receiving, by at least one specifically programmed computer system, a first travel request from a first traveler; wherein the first travel request comprises a first pickup location, a first destination location, and a first number of travelers. In some embodiments, the method includes analyzing, by the at least one specifically programmed computer system, the first travel request and calculating, by the at least one specifically programmed computer system, a plurality of routes for a plurality of vehicles that are based, at least in part, on (i) the first pickup location; (ii) the first destination location; (iii) the first number of travelers; (iv) a plurality of destination locations of a plurality of travelers located in each of the plurality of vehicles; (v) at least one of: historic traffic conditions and real time traffic conditions; (vi) minimizing a first waiting time for the first traveler; (vii) minimizing a first travel time for the first traveler; (viii) minimizing a second travel time for each of the plurality of travelers located in each of the plurality of vehicles; and (ix) optimizing an aggregation of travelers on each of the plurality vehicles.

In some embodiments, the plurality of vehicles comprises at least 5 vehicles. In some embodiments, based on the calculating, supplying, by the at least one specifically programmed computer system, a selected route from the plurality of routes to a selected vehicle of the plurality of vehicles and based on the calculating, supplying, by the at least one specifically programmed computer system, to the first traveler, identification information related to the selected vehicle, thereby resulting in transportation of the first traveler to the first destination location.

In some embodiments, the plurality of vehicles comprises at least 10 vehicles. In some embodiments, the plurality of vehicles comprises at least 50 vehicles. In some embodiments, the plurality of vehicles comprises at least 100 vehicles.

In some embodiments, the method includes calculating, by the at least one specifically programmed computer system, the plurality of routes for the plurality of vehicles is further based, at least in part, on at least one of: (x) a plurality of pickup locations of a plurality of travelers assigned to each of the plurality of vehicles and (xi) historic traveler information.

In some embodiments, the method includes supplying, by the at least one specifically programmed computer system, a proposal to the first traveler; wherein the proposal comprises at least one of the following: (i) a proposed pickup location; (ii) a proposed pickup time; (iii) a proposed travel time estimate; and (iv) a proposed price.

In some embodiments, the method includes receiving, by the at least one specifically programmed computer system, confirmation from the first traveler the proposal is accepted.

In some embodiments, the plurality of passengers in the first vehicle comprises at least 3 people. In some embodiments, the plurality of passengers in the first vehicle comprises at least 5 people. In some embodiments, the first waiting time is less than 12 minutes.

In some embodiments, the method is a computer-implemented method that includes receiving, by at least one specifically programmed computer system, a plurality of first travel requests from a plurality of first travelers; wherein each of the first travel requests comprises a first pickup location, a first destination location, and a first number of travelers.

In some embodiments, the method includes analyzing, by the at least one specifically programmed computer system, the first travel requests; calculating, by the at least one specifically programmed computer system, a plurality of routes for a plurality of vehicles that are based, at least in part, on (i) the first pickup locations; (ii) the first destination locations; (iii) the first number of travelers; (iv) a plurality of destination locations of a plurality of travelers located in each of the plurality of vehicles; (v) at least one of: historic traffic conditions and real time traffic conditions; (vi) minimizing a first waiting time for each of the plurality of first travelers; (vii) minimizing a first travel time for each of the plurality of first travelers; (viii) minimizing a second travel time for each of the plurality of travelers located in each of the plurality of vehicles; and (ix) optimizing an aggregation of travelers on each of the plurality vehicles.

In some embodiments, the plurality of vehicles comprises at least 5 vehicles. In some embodiments, the method includes, based on the calculating, supplying, by the at least one specifically programmed computer system, selected routes from the plurality of routes to selected vehicles of the plurality of vehicles; and based on the calculating, supplying, by the at least one specifically programmed computer system, to each of the first travelers, identification information related to the selected vehicles, thereby resulting in transportation of the first travelers to the first destination locations. In some embodiments, the plurality of vehicles comprises at least 10 vehicles. In some embodiments, the plurality of vehicles comprises at least 50 vehicles. In some embodiments, the plurality of vehicles comprises at least 100 vehicles.

In some embodiments, the method includes calculating, by the at least one specifically programmed computer system, the plurality of routes for the plurality of vehicles is further based, at least in part, on at least one of: (x) a plurality of pickup locations of a plurality of travelers assigned to each of the plurality of vehicles and (xi) historic traveler information.

In some embodiments, the plurality of passengers in the first vehicle comprises at least 3 people. In some embodiments, the plurality of passengers in the first vehicle comprises at least 5 people. In some embodiments, the first waiting time is less than 12 minutes.

In some embodiments, the system is a programmed computer that includes memory having at least one region for storing computer executable program code; and a processor for executing the program code stored in the memory.

In some embodiments, the program code includes code to receive a first travel request from a first traveler; wherein the first travel request comprises a first pickup location, a first destination location, and a first number of travelers; code to analyze the first travel request; and code to calculate a plurality of routes for a plurality of vehicles that are based, at least in part, on (i) the first pickup location; (ii) the first destination location; (iii) the first number of travelers; (iv) a plurality of destination locations of a plurality of travelers located in each of the plurality of vehicles; (v) at least one of: historic traffic conditions and real time traffic conditions; (vi) minimizing a first waiting time for the first traveler; (vii) minimizing a first travel time for the first traveler; (viii) minimizing a second travel time for each of the plurality of travelers located in each of the plurality of vehicles; and (ix) optimizing an aggregation of travelers on each of the plurality vehicles.

In some embodiments, the plurality of vehicles comprises at least 5 vehicles.

In some embodiments, the program code includes code to supply a selected route from the plurality of routes to a selected vehicle of the plurality of vehicles; and code to supply to the first traveler, identification information related to the selected vehicle, thereby resulting in transportation of the first traveler to the first destination location.

In some embodiments, the plurality of vehicles comprises at least 10 vehicles. In some embodiments, the plurality of vehicles comprises at least 50 vehicles.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIGS. 6A-6C illustrate screen shots of some embodiments of the present invention.

Figure 1:
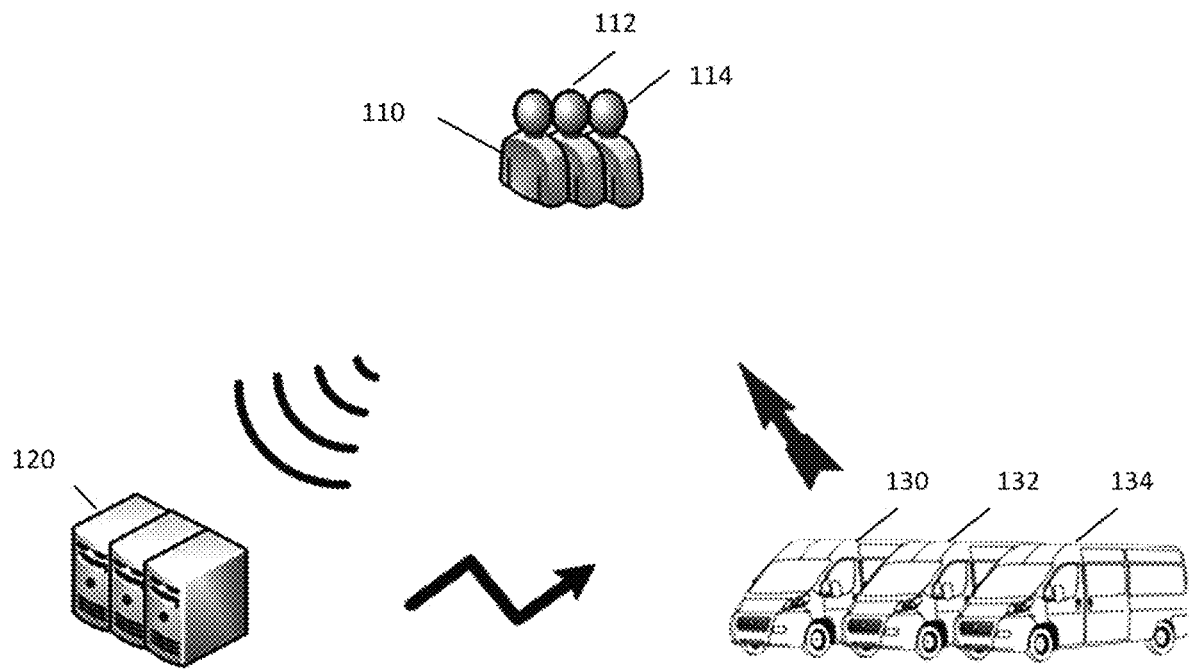
FIG. 1 illustrates features of some embodiments of the present invention.

The figures constitute a part of this specification and include illustrative embodiments of the present invention and illustrate various objects and features thereof. Further, the figures are not necessarily to scale, some to features may be exaggerated show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, "user", "traveler", "member", and/or "customer" are used interchangeable to refer to a user or potential user of the system and method of the present invention.

In some embodiments, the method is a computer-implemented method, comprising: receiving, by at least one specifically programmed computer system, a plurality of first travel requests from a plurality of first travelers during a first time period; wherein each of the first travel requests comprises a first pickup location and a first destination location; and wherein the plurality of first travelers includes at least 50 travelers.

In some embodiments, the method includes analyzing, by the at least one specifically programmed computer system, the plurality of first travel requests and calculating, by the at least one specifically programmed computer system, a plurality of first routes for the plurality of first travelers based, at least in part, on the analyzing of the plurality of the first travel requests.

In some embodiments, the calculating of each first route of the plurality of first routes is based, at least in part, on: (i) minimizing a first waiting time for each first traveler and (ii) maximizing an aggregation of first travelers on each of a plurality of transportation vehicles.

In some embodiments, the method includes supplying, by the at least one specifically programmed computer system, the plurality of first routes to the plurality of transportation vehicles thereby resulting in transportation of a first portion of the plurality of first travelers and receiving, by the at least one specifically programmed computer system, a plurality of second travel requests from a plurality of second travelers during a second time period.

In some embodiments, the first time period is distinct from the second time period and each of the second travel requests comprises a second pickup location and a second destination location.

In some embodiments, the plurality of second travelers includes at least 50 travelers.

In some embodiments, the method includes analyzing, by the at least one specifically programmed computer system, the plurality of second travel requests and calculating, by the at least one specifically programmed computer system, a plurality of second routes for a remainder of the plurality of first travelers and the plurality of second travelers based, at least in part, on analysis of the first travel requests and the second travel requests.

In some embodiments, the calculating of each second route of the plurality of second routes is based, at least in part, on: (i) minimizing the first waiting time for each of the remainder of first travelers and a second waiting time for each second traveler and (ii) maximizing an aggregation of the remainder of first travelers and the plurality of second travelers on each of the plurality of transportation vehicles.

In some embodiments, the remainder of the plurality of first travelers includes each of the first travelers not include in the first portion of the plurality of first travelers.

In some embodiments, the method includes supplying, by the at least one specifically programmed computer system, the plurality of second routes to the plurality of transportation vehicles thereby resulting in transportation of the remainder of the plurality of first travelers and at least a second portion of the plurality of second travelers.

In some embodiments, the plurality of first travelers includes at least 100 travelers. In some embodiments, the plurality of first travelers includes at least 200 travelers. In some embodiments, the plurality of first travelers includes at least 300 travelers.

In some embodiments, the first time period, the second time period, or both ranges from 14 to 17 minutes. In some embodiments, the first time period, second time period, or both is 5 to 7 minutes.

In some embodiments, the plurality of transportation vehicles comprise 450 vehicles.

In some embodiments, the method is a computer-implemented method, comprising: receiving, by at least one specifically programmed computer system, a plurality of first travel requests from a plurality of first travelers during a first time period; wherein each of the first travel requests comprises a first pickup location and a first destination location; and wherein the plurality of first travelers includes at least 50 travelers.

In some embodiments, the method includes analyzing, by the at least one specifically programmed computer system, the plurality of first travel requests and calculating, by the at least one specifically programmed computer system, a plurality of first routes for the plurality of first travelers based, at least in part, on the analyzing of the plurality of the first travel requests.

In some embodiments, the calculating of each first route of the plurality of first routes is based, at least in part, on: (i) minimizing a first waiting time for each first traveler; (ii) maximizing an aggregation of first travelers on each of a plurality of transportation vehicles; and (iii) at least one of the following: (a) historical traffic conditions; (b) historical travel requests from one or more of the plurality of first travelers; and (c) event information.

In some embodiments, the method includes supplying, by the at least one specifically programmed computer system, the plurality of first routes to the plurality of transportation vehicles thereby resulting in transportation of a first portion of the plurality of first travelers. In some embodiments, the method includes receiving, by the at least one specifically programmed computer system, a plurality of second travel requests from a plurality of second travelers during a second time period. In some embodiments, the first time period is distinct from the second time period.

In some embodiments, each of the second travel requests comprises a second pickup location and a second destination location. In some embodiments, the plurality of second travelers includes at least 50 travelers.

In some embodiments, the method includes analyzing, by the at least one specifically programmed computer system, the plurality of second travel requests and calculating, by the at least one specifically programmed computer system, a plurality of second routes for a remainder of the plurality of first travelers and the plurality of second travelers based, at least in part, on analysis of the first travel requests and the second travel requests.

In some embodiments, the calculating of each second route of the plurality of second routes is based, at least in part, on: (i) minimizing the first waiting time for each of the remainder of first travelers and a second waiting time for each second traveler and (ii) maximizing an aggregation of the remainder of first travelers and the plurality of second travelers on each of the plurality of transportation vehicles; and (ii) at least one of the following: (a) historical traffic conditions; (b) historical travel requests from one or more of the remainder of first travelers; (c) historical travel requests from one or more of the plurality of second travelers and (d) event information.

In some embodiments, the remainder of the plurality of first travelers includes each of the first travelers not include in the first portion of the plurality of first travelers. In some embodiments, the method includes supplying, by the at least one specifically programmed computer system, the plurality of second routes to the plurality of transportation vehicles thereby resulting in transportation of the remainder of the plurality of first travelers and at least a second portion of the plurality of second travelers.

In some embodiments, the plurality of first travelers includes at least 100 travelers. In some embodiments, the plurality of first travelers includes at least 200 travelers. In some embodiments, the plurality of first travelers includes at least 300 travelers.

In some embodiments, the first time period, the second time period, or both ranges from 14 to 17 minutes. In some embodiments, the first time period, second time period, or both is 5 to 7 minutes. In some embodiments, the plurality of transportation vehicles comprise 450 vehicles.

In some embodiments, the system is a programmed computer comprising: memory having at least one region for storing computer executable program code; and a processor for executing the program code stored in the memory.

In some embodiment, the program code comprises code to receive a plurality of first travel requests from a plurality of first travelers during a first time period. In some embodiments, each of the first travel requests comprises a first pickup location and a first destination location; wherein the plurality of first travelers includes at least 50 travelers.

In some embodiments, the program code comprises code to analyze the plurality of first travel requests and code to calculate a plurality of first routes for the plurality of first travelers based, at least in part, on the analyzing of the plurality of the first travel requests. In some embodiments, the code to calculate of each first route of the plurality of first routes is based, at least in part, on: (i) minimizing a first waiting time for each first traveler and (ii) maximizing an aggregation of first travelers on each of a plurality of transportation vehicles.

In some embodiments, the program code comprises code to supply the plurality of first routes to the plurality of transportation vehicles thereby resulting in transportation of a first portion of the plurality of first travelers. In some embodiments, the program code comprises code to receive a plurality of second travel requests from a plurality of second travelers during a second time period. In some embodiments, the first time period is distinct from the second time period. In some embodiments, each of the second travel requests comprises a second pickup location and a second destination location.

In some embodiments, the plurality of second travelers includes at least 50 travelers.

In some embodiments, the program code comprises code to analyze the plurality of second travel requests and code to calculate a plurality of second routes for a remainder of the plurality of first travelers and the plurality of second travelers based, at least in part, on analysis of the first travel requests and the second travel requests.

In some embodiments, the code to calculate of each second route of the plurality of second routes is based, at least in part, on: (i) minimizing the first waiting time for each of the remainder of first travelers and a second waiting time for each second traveler and (ii) maximizing an aggregation of the remainder of first travelers and the plurality of second travelers on each of the plurality of transportation vehicles.

In some embodiments, the remainder of the plurality of first travelers includes each of the first travelers not include in the first portion of the plurality of first travelers. In some embodiments, the program code includes code to supply the plurality of second routes to the plurality of transportation vehicles thereby resulting in transportation of the remainder of the plurality of first travelers and at least a second portion of the plurality of second travelers.

In some embodiments, the plurality of first travelers includes at least 100 travelers. In some embodiments, the plurality of first travelers includes at least 200 travelers. In some embodiments, the plurality of first travelers includes at least 300 travelers. In some embodiments, the first time period, the second time period, or both ranges from 14 to 17 minutes. In some embodiments, the plurality of transportation vehicles comprise 450 vehicles.

In some embodiments, the method includes a computer-implemented method that includes receiving, by at least one specifically programmed computer system, a first travel request from a first traveler; wherein the first travel request comprises a first pickup location, a first destination location, and a first number of travelers. In some embodiments, the method includes analyzing, by the at least one specifically programmed computer system, the first travel request and calculating, by the at least one specifically programmed computer system, a plurality of routes for a plurality of vehicles that are based, at least in part, on (i) the first pickup location; (ii) the first destination location; (iii) the first number of travelers; (iv) a plurality of destination locations of a plurality of travelers located in each of the plurality of vehicles; (v) at least one of: historic traffic conditions and real time traffic conditions; (vi) minimizing a first waiting time for the first traveler; (vii) minimizing a first travel time for the first traveler; (viii) minimizing a second travel time for each of the plurality of travelers located in each of the plurality of vehicles; and (ix) optimizing an aggregation of travelers on each of the plurality vehicles.

In some embodiments, the plurality of vehicles comprises at least 5 vehicles. In some embodiments, based on the calculating, supplying, by the at least one specifically programmed computer system, a selected route from the plurality of routes to a selected vehicle of the plurality of vehicles and based on the calculating, supplying, by the at least one specifically programmed computer system, to the first traveler, identification information related to the selected vehicle, thereby resulting in transportation of the first traveler to the first destination location.

In some embodiments, the plurality of vehicles comprises at least 10 vehicles. In some embodiments, the plurality of vehicles comprises at least 50 vehicles. In some embodiments, the plurality of vehicles comprises at least 100 vehicles.

In some embodiments, the method includes calculating, by the at least one specifically programmed computer system, the plurality of routes for the plurality of vehicles is further based, at least in part, on at least one of; (x) a plurality of pickup locations of a plurality of travelers assigned to each of the plurality of vehicles and (xi) historic traveler information.

In some embodiments, the method includes supplying, by the at least one specifically programmed computer system, a proposal to the first traveler; wherein the proposal comprises at least one of the following: (i) a proposed pickup location; (ii) a proposed pickup time; (iii) a proposed travel time estimate; and (iv) a proposed price.

In some embodiments, the method includes receiving, by the at least one specifically programmed computer system, confirmation from the first traveler the proposal is accepted.

In some embodiments, the plurality of passengers in the first vehicle comprises at least 3 people. In some embodiments, the plurality of passengers in the first vehicle comprises at least 5 people. In some embodiments, the first waiting time is less than 12 minutes.

In some embodiments, the method is a computer-implemented method that includes receiving, by at least one specifically programmed computer system, a plurality of first travel requests from a plurality of first travelers;

wherein each of the first travel requests comprises a first pickup location, a first destination location, and a first number of travelers.

In some embodiments, the method includes analyzing, by the at least one specifically programmed computer system, the first travel requests; calculating, by the at least one specifically programmed computer system, a plurality of routes for a plurality of vehicles that are based, at least in part, on (i) the first pickup locations; (ii) the first destination locations; (iii) the first number of travelers; (iv) a plurality of destination locations of a plurality of travelers located in each of the plurality of vehicles; (v) at least one of: historic traffic conditions and real time traffic conditions; (vi) minimizing a first waiting time for each of the plurality of first travelers; (vii) minimizing a first travel time for each of the plurality of first travelers; (viii) minimizing a second travel time for each of the plurality of travelers located in each of the plurality of vehicles; and (ix) optimizing an aggregation of travelers on each of the plurality vehicles.

In some embodiments, the plurality of vehicles comprises at least 5 vehicles. In some embodiments, the method includes, based on the calculating, supplying, by the at least one specifically programmed computer system, selected routes from the plurality of routes to selected vehicles of the plurality of vehicles; and based on the calculating, supplying, by the at least one specifically programmed computer system, to each of the first travelers, identification information related to the selected vehicles, thereby resulting in transportation of the first travelers to the first destination locations. In some embodiments, the plurality of vehicles comprises at least 10 vehicles. In some embodiments, the plurality of vehicles comprises at least 50 vehicles. In some embodiments, the plurality of vehicles comprises at least 100 vehicles.

In some embodiments, the method includes calculating, by the at least one specifically programmed computer system, the plurality of routes for the plurality of vehicles is further based, at least in part, on at least one of: (x) a plurality of pickup locations of a plurality of travelers assigned to each of the plurality of vehicles and (xi) historic traveler information.

In some embodiments, the plurality of passengers in the first vehicle comprises at least 3 people. In some embodiments, the plurality of passengers in the first vehicle comprises at least 5 people. In some embodiments, the first waiting time is less than 12 minutes.

In some embodiments, the system is a programmed computer that includes memory having at least one region for storing computer executable program code; and a processor for executing the program code stored in the memory.

In some embodiments, the program code includes code to receive a first travel request from a first traveler; wherein the first travel request comprises a first pickup location, a first destination location, and a first number of travelers; code to analyze the first travel request; and code to calculate a plurality of routes for a plurality of vehicles that are based, at least in part, on (i) the first pickup location; (ii) the first destination location; (iii) the first number of travelers; (iv) a plurality of destination locations of a plurality of travelers located in each of the plurality of vehicles; (v) at least one of: historic traffic conditions and real time traffic conditions; (vi) minimizing a first waiting time for the first traveler; (vii) minimizing a first travel time for the first traveler; (viii) minimizing a second travel time for each of the plurality of travelers located in each of the plurality of vehicles; and (ix) optimizing an aggregation of travelers on each of the plurality vehicles.

In some embodiments, the plurality of vehicles comprises at least 5 vehicles.

In some embodiments, the program code includes code to, based on the calculate, supply a selected route from the plurality of routes to a selected vehicle of the plurality of vehicles; and code to, based on the calculate, supply to the first traveler, identification information related to the selected vehicle, thereby resulting in transportation of the first traveler to the first destination location.

In some embodiments, the plurality of vehicles comprises at least 10 vehicles. In some embodiments, the plurality of vehicles comprises at least 50 vehicles.

In some embodiments, the present invention includes the steps of a person located at home, at work, at a restaurant, and/or at any other location from which the person may require transportation. In some embodiments, prior to preparing to leave, a person presses one or more buttons on a phone or other mobile device. In some embodiments, a vehicle, which may be spacious and well-appointed, arrives at the person's location. In some embodiments, a courteous driver welcomes the person by name. In some embodiments, the person scans in the confirmation barcode displayed on a phone's screen, and joins the person's co-passengers in the vehicle. In some embodiments, the driver follows a route that allows other passengers to get on and off with minimal impact to the person's overall travel time as directed by a computer algorithm. In some embodiments, the trip ends at a location within approximately two blocks of the specified destination, and as the person steps out, the driver wishes the person a good day. In some embodiments, the cost is comparable to the cost of a bus ticket.

In some embodiments, the present invention is a transportation solution, offering customers point-to-point transit that is affordable, convenient and eco-friendly. In some embodiments, the present invention is a service that may employ one or more and up to several hundred vehicles that respond to passengers' travel needs in real time. In some embodiments, customers request rides using a smartphone app, and are picked up and dropped off at or near their doorstep. In some embodiments, the present invention includes a routing algorithm that aggregates passengers traveling along similar routes into a single vehicle. In some embodiments, such efficient passenger aggregation allows the present invention to set fares at low price including, but not limited to $5which is comparable to the cost of public transportation, while guaranteeing a travel experience far superior to a public bus, train or private car.

In some embodiments, other vehicles and technology may be incompatible with the model of the present invention.

In some embodiments, the present invention includes an algorithm and technology required for its operation. In some embodiments, the present invention will provide service to more than 50,000 customers per day and/or operate more than 450 vehicles. In some embodiments, the present invention will provide service to more than 100,000 customers per day and/or operate more than 600 vehicles. In some embodiments, the present invention will provide service to more than 200,000 customers per day and/or operate more than 800 vehicles. In some embodiments, the present invention will provide service to more than 20,000 customers per day and/or operate more than 150 vehicles. In some embodiments, the present invention will provide service to more than 25,000 customers per day and/or operate more than 100 vehicles. In some embodiments, the present invention will provide service to more than 20,000 customers per day and/or operate more than 100 vehicles. In some embodiments, the present invention will provide service to more than 15,000 customers per day and/or operate more than 75 vehicles. In some embodiments, the present invention will provide service to more than 10,000 customers per day and/or operate more than 50 vehicles. In some embodiments, the present invention will provide service to more than 30,000 customers per day and/or operate more than 100 vehicles. In some embodiments, the present invention will provide service to more than 70,000 customers per day and/or operate more than 150 vehicles. In some embodiments, the present invention will provide service to more than 60,000 customers per day and/or operate more than 200 vehicles. In some embodiments, the present invention will provide service to more than 5,000 customers per day or less and/or operate 100 vehicles or less.

In some embodiments, the present invention will be set up in one or more cities.

In some embodiments, the present invention is a reasonably-priced, convenient, eco-friendly, door-to-door or point-to-point transit solution. In some embodiments, the present invention incorporates smartphone and/or GPS technology for a novel transportation solution that delivers point-to-point service at a modest cost.

In some embodiments, the present invention employs a fleet of high-occupancy vehicles (including but not limited to eight to eleven-passenger vans and/or four to five-passenger SUVs and/or other vehicle suitable for transporting travelers), and targets major urban centers. In some embodiments, the vehicles, deployed throughout the city, are directed by a fully automated central control system and dynamically adapt their routes to respond to passengers' travel requests as shown in FIG. 1. In some embodiments, passengers 110, 112, 114 request rides using a smartphone app. In some embodiments, a fully automated central control system 120 responds in real time to reroute nearby vans or other vehicles. In some embodiments, a fleet of vans 130, 132, 134 or other vehicles are deployed throughout the city to pick up travelers at or near their doorstep. In some embodiments, the pickup include minimal impact to the travel time of the passengers onboard.

Figure 2:
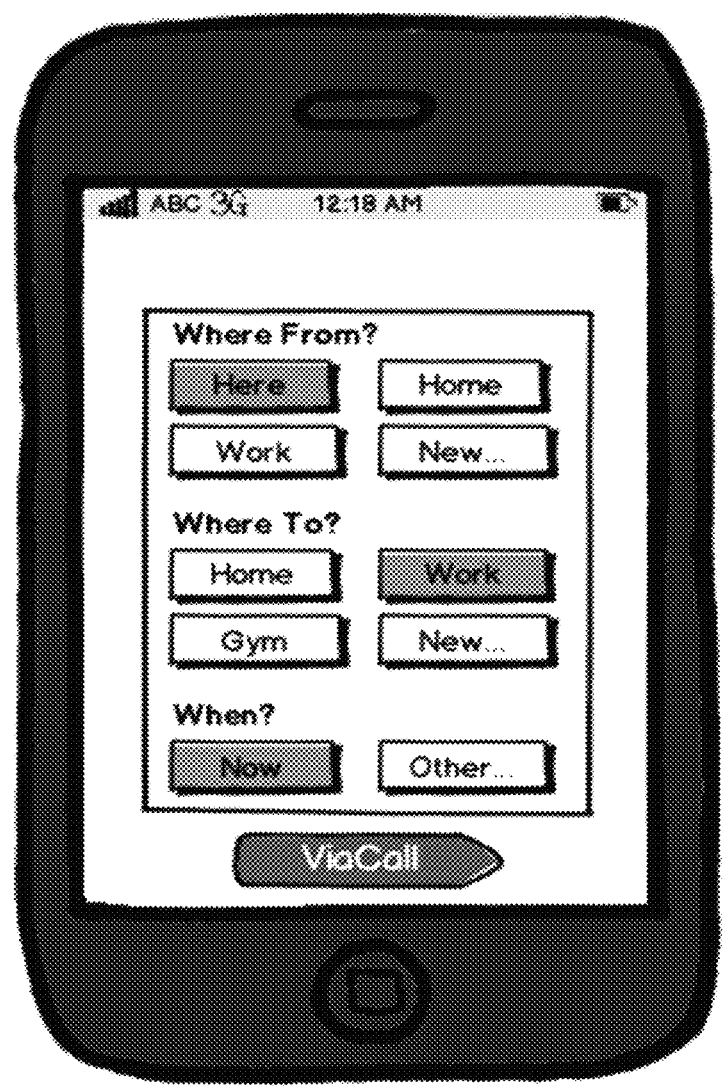
FIG. 2 illustrates features of some embodiments of the present invention.

In some embodiments, customers travel request is sent using a simple-to-use smartphone app as shown in FIG. 2, and the present invention redirects nearby vehicles to pick up passengers on the corner nearest to them and drop them off within two blocks of their destination. In some embodiments, the present invention's algorithm aggregates customers traveling along similar routes, ensuring detours to pick up and drop off passengers have minimal impact on the overall travel time of other passengers. In some embodiments, using historical data, the algorithm also anticipates upcoming ride requests, adjusting vehicle routes and deployment accordingly. In some embodiments, to simplify payment and reduce boarding times, passengers' credit cards on file are automatically charged when they board or disembark from the vehicle.

In some embodiments, the present invention offers convenient point-to-point service. In some embodiments, because vehicles are shared by several passengers, the present invention makes efficient use of existing road infrastructure, thereby reducing traffic congestion and greenhouse gas emissions. In some embodiments, the present invention's solution does not require any investment in new road or rail infrastructure and thus can scale to markets across the world.

In some embodiments, the present invention includes enabling technology that uses mobile technology to establish a new, disruptive transportation service that delivers superior value to customers. In some embodiments, the present invention uses GPS-equipped smartphones to make possible continuous two-way information exchange between the present invention and numerous passengers. In some embodiments, this communication exchange is utilized to receive, evaluate, and respond to numerous concurrent travel requests and trip logistics in real time; essentially, the present invention utilizes mobile technology to precisely identify demand for transportation at any given time, and to optimize its service accordingly and/or continuously stream updates regarding route and estimated time of arrival to passengers' phones, ensuring a predictable and dependable travel experience.

Figure 3:
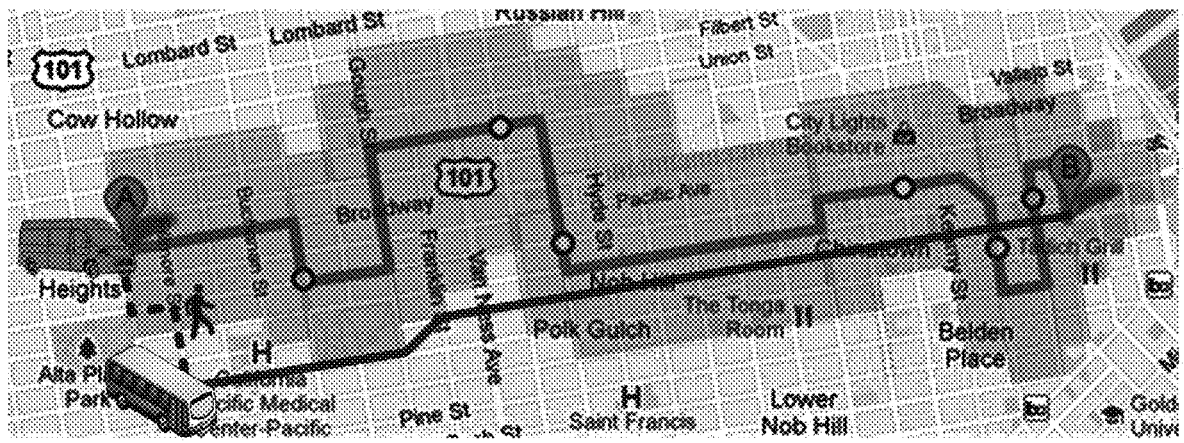
FIG. 3 illustrates features of some embodiments of the present invention.

In some embodiments, the present invention is focused on densely populated urban centers. In some embodiments, by targeting major cities—where large numbers of passengers travel along overlapping routes—the present invention can pool passengers without incurring excessive detours or delays. In some embodiments, FIG. 3 illustrates how the present invention is able to offer point-to-point (or near door-to-door) service and efficiently aggregate passengers, achieving high quality of service at a low cost. In some embodiments, FIG. 3 shows a van of the present invention serving a "route" that is several blocks wide (blue shading). In some embodiment, the van shown in FIG. 3 provides point-to-point service to passengers departing from within this route, and traveling in the same direction. In some embodiments, a public bus' route, by contrast, is effectively one street wide (red line), and requires passengers to walk to their stop (dashed gray line).

In some embodiments, the present invention is a complete transportation solution. In some embodiments, the present invention is a complete solution because it includes, but is not limited to, an app and the vehicles. In some embodiments, the present invention retains control over every facet of the travel experience, which allows it to maintain quality of service at all times.

In some embodiments, the present invention provides personalized service and well-equipped vehicles that may include, but are not limited to Wi-Fi, food and/or beverages, and the day's newspaper. In some embodiments, the quality of service is equal to or better than that of a personal chauffeur. In some embodiments, the present invention includes pickup at the corner nearest to a passenger's location, real-time van location updates, and/or unsurpassed comfort which allows passengers to make the most of their time, both while waiting for pick up and during travel.

In some embodiments, the present invention includes environmental awareness to reduce carbon footprint and impact to greenhouse gas emissions.

In some embodiments, the present invention incorporates industry trends such as the use of mobile technology in transportation. The use of mobile apps to book or arrange transit is becoming increasingly familiar to customers.

In some embodiments, the present invention provides for a data-driven model. In some embodiments, the present invention includes a data-driven model that may include collecting and analyzing real-time data on the transportation needs of passengers. In some embodiments, the present invention utilizes information to tailor its service to customers' travel needs, and to continuously drive improvement to its operation. In some embodiments, the present invention is capable of generating a database of consumer travel behavior that may be used for highly-targeted mobile advertising.

In some embodiments, the present invention is an on-demand model that targets a substantial, unmet need in the transportation market: transportation that allows for affordability, convenience, the ability to utilize travel time productively, and environmental sustainability.

In some embodiments, the present invention is a model for urban transportation that has the potential to revolutionize transportation in cities across the world, not least in major US markets such as San Francisco, New York, Washington DC, Boston, and Chicago. In some embodiments, multiple factors, including population density, existing public transportation solutions, traffic congestion, and the regulatory environment, influence the degree to which the present invention matches the transportation needs of a city.

In some embodiments, the present invention's mission is to establish the world's first affordable and convenient point-to-point transportation service. In some embodiments, the present invention includes passenger aggregation. In some embodiments, the present invention provides affordable service because its vehicles are shared by several customers—passenger aggregation reduces the present invention's per-passenger costs and often results in lower fares. In some embodiments, the present invention currently expects to price rides at $8 per passenger. In some embodiments, the present invention includes each vehicle providing at least eight rides per hour.

Figure 4:
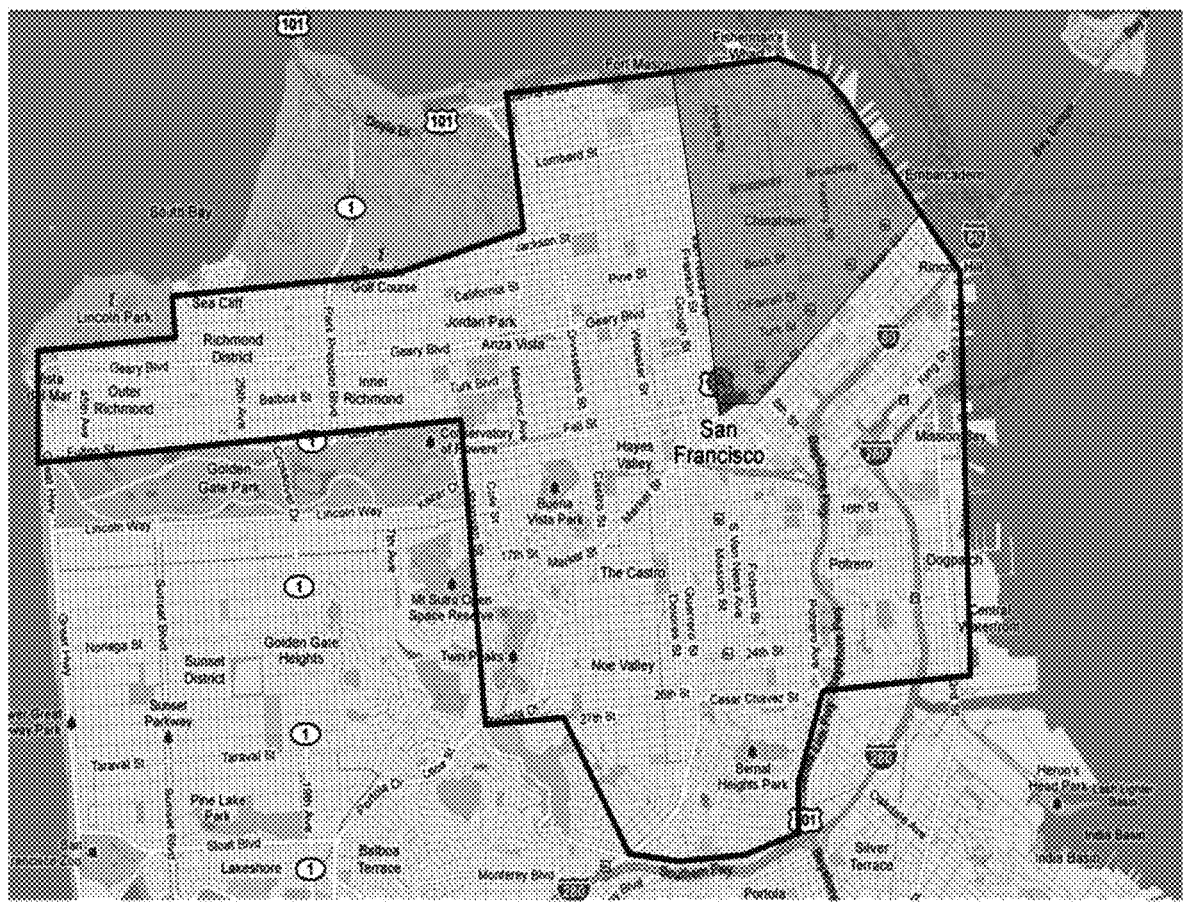
FIG. 4 illustrates features of some embodiments of the present invention.

In some embodiments, the present invention includes high quality of service (QoS) that includes, but is not limited to, short wait times for pick up, few and brief detours to pick up and drop off other passengers. In some embodiments, QoS requirements are critical because they determine the number of vehicles the present invention must deploy. As a non-limiting example, a simple QoS criterion, requiring that vehicles be positioned every three-block-by-three-block square (~0.09 square miles), or ~1.5 minutes apart. In the non-limiting example, to serve the region in FIG. 4 (17.5 square miles encompassing San Francisco's most densely populated residential areas and many of its major businesses), while satisfying this simple criterion, the present invention will likely need to deploy at least 200 vehicles. In other embodiments, the present invention will require deployment of less than 200 vehicles. In yet other embodiments, the present invention will require deployment of more than 200 vehicles.

In some embodiments, to more precisely estimate the market share required for profitability, and the number of vehicles needed to achieve high QoS, the present invention has developed an analytical model that accounts for the full complexity of its service. In some embodiments, the analytical model includes, but is not limited to, 1) to pick up a passenger, a vehicle must not only be near the passenger's pick-up location, but also travel in the same direction as the passenger's desired destination; 2) passenger aggregation and QoS are not independent requirements—increased passenger aggregation negatively impacts QoS by adding to the number of pick-up/drop-off detours; 3) driving speeds and QoS requirements differ between neighborhoods in the city, and between rush hour and non-peak times; 4) detour durations decrease as passenger density (i.e. adoption of present invention's service) increases; and/or 5) SG&A and R&D expenses associated with operating a vehicle fleet. In some embodiments, the analytical model has been applied to San Francisco and New York City, with different driving speeds and QoS requirements in the business district(s) (shaded pink in FIG. 4 for San Francisco) vs. other parts of the city.

In some embodiments, assuming the following QoS requirements: wait time for pick up is less than 12 minutes (10 in the business district); mean detour duration is under 2 minutes; and total duration of all detours experienced by a passenger is less than 12 minutes (10 in downtown) or 30% of the overall travel time, the model predicts that 50,000 daily trips can be provided by 450 vehicles.

In some embodiments, the method is a computer-implemented method, that includes, but is not limited to, receiving, by at least one specifically programmed computer system, a first travel request from a first traveler; wherein the first travel request comprises a first pickup location and a first destination location and analyzing, by the at least one specifically programmed computer system, the first travel request.

In some embodiments, the number of travelers is at least 2. In some embodiments, the number of travelers is at least 4. In some embodiments, the number of travelers is at least 5. In some embodiments, the number of travelers is at least 2. In some embodiments, the number of travelers is at least 10. In some embodiments, the number of travelers is at least 20. In some embodiments, the number of travelers is at least 30. In some embodiments, the number of travelers is at least 50. In some embodiments, the number of travelers is at least 100. In some embodiments, the number of travelers is at least 200. In some embodiments, the number of travelers is at least 400. In some embodiments, the number of travelers is at least 600. In some embodiments, the number of travelers is at least 2. In some embodiments, the number of travelers is at least 800. In some embodiments, the number of travelers is at least 1000. In some embodiments, the number of travelers is at least 5000. In some embodiments, the number of travelers is at least 10000. In some embodiments, the number of travelers is at least 15000. In some embodiments, the number of travelers is at least 20000. In some embodiments, the number of travelers is at least 50000.

In some embodiments, the method further includes calculating, by the at least one specifically programmed computer system, a plurality of routes for each of a plurality of vehicles that is based, at least in part, on (i) the first pickup location, (ii) the first destination location and (iii) a plurality of destination locations of a plurality of travelers located in each of the plurality of vehicles. In some embodiments, the plurality of routes for each of the plurality of vehicles includes at least 2 routes. In some embodiments, the plurality of routes includes at least 3 routes. In some embodiments, the plurality of routes includes at least 5 routes. In some embodiments, the plurality of routes includes at least 7 routes. In some embodiments, the plurality of routes includes at least 10 routes. In some embodiments, the plurality of routes includes at least 15 routes. In some embodiments, the plurality of routes includes at least 20 routes. In some embodiments, the plurality of routes includes at least 30 routes. In some embodiments, the plurality of routes includes at least 40 routes. In some embodiments, the plurality of routes includes at least 50 routes. In some embodiments, the plurality of mutes includes at least 75 routes. In some embodiments, the plurality of routes includes at least 100 routes. In some embodiments, the plurality of routes includes at least 150 routes. In some embodiments, the plurality of routes includes at least 250 routes. In some embodiments, the plurality of routes includes at least 400 routes.

In some embodiments, the plurality of routes includes at least 1000 routes. In some embodiments, the plurality of routes includes at least 5000 routes. In some embodiments, the plurality of routes includes at least 10000 routes. In some embodiments, the plurality of routes includes at least 20000 routes. In some embodiments, the plurality of routes includes at least 30000 routes. In some embodiments, the plurality of routes includes at least 40000 routes. In some embodiments, the plurality of routes includes at least 50000 routes. In some embodiments, the plurality of routes includes at least 70000 routes. In some embodiments, the plurality of routes includes at least 80000 routes. In some embodiments, the plurality of routes includes at least 100000 routes. In some embodiments, the plurality of routes includes at least 150000 routes. In some embodiments, the plurality of routes includes at least 200000 routes. In some embodiments, the plurality of routes includes at least 500000 routes.

In some embodiments, the method further comprises selecting, by the at least one specifically programmed computer system, a selected route from the plurality of routes for each of the plurality of vehicles based, at least in part, on: (i) minimizing a first waiting time for the first traveler; (ii) minimizing a first travel time for the first traveler; (iii) minimizing a second travel time for each of the plurality of travelers located in each of the plurality of vehicles; and (iv) historic traffic conditions and driving speeds along the selected route.

In some embodiments, the method further includes selecting, by the at least one specifically programmed computer system, a selected vehicle from the plurality of vehicles to pickup the first traveler at the pickup location based, at least in part, on: (i) optimizing an aggregation of travelers on each of the plurality vehicles; and (ii) the selected route associated with the selected vehicle.

In some embodiments, the method further includes supplying, by the at least one specifically programmed computer system, to the first traveler, identification information related to the selected vehicles; and supplying, by the at least one specifically programmed computer system, the selected route to the selected vehicle thereby resulting in transportation of the first traveler to the first destination location.

In some embodiments, the model also reveals that average vehicle occupancy in all of these scenarios does not exceed 6.6 passengers, which supports the present invention's selection of vehicles that include, but are limited to eight to eleven-passenger vans that reflect relatively small, inexpensive, and efficient vehicles that enable a highly flexible service model and leave room for future growth.

In some embodiments, the present invention's passengers are registered subscribers, with payment information on file. In some embodiments, subscription, at least initially, will not require a fee. In some embodiments, in addition to single-ride fares, subscribers will be able to purchase unlimited-ride passes at a weekly and/or monthly rate as well as packs of rides at a discounted rate. In some embodiments, a premier subscription option (guaranteeing improved QoS), and frequent rider program will also be offered.

In some embodiments, the present invention's service creates potential revenue sources not available to traditional transportation companies. In some embodiments, the present invention's database of customers' travel history and current needs can be used to serve highly targeted mobile ads. In some embodiments, the present invention includes a social dimension that can be seamlessly integrated into the present invention's service, with passengers expressing preference for sharing vehicles with 'friends', or electing to receive updates when 'friends' embark on a new trip. In some embodiments, the present invention's service can be expanded to accommodate niche needs, such as child-friendly transportation ('soccer-mom service').

In some embodiments, the present invention uses vans or other vehicles for transporting travelers such as sport utility vehicles, sedans, or other vehicle. In some embodiments, the vans have between eight and eleven passenger seats. In some embodiments, the present invention calls for a novel service model that involves unprecedented use of information technology in ground transportation, and an exceptional customer experience. In some embodiments, the present invention's model is incompatible with the culture of existing service providers. In some embodiments, the present invention's service depends on development of a proprietary routing algorithm and dedicated user and back-end technology. In some embodiments, the knowledge and experience required to rapidly develop such technology is not commonplace in the transportation industry.

In some embodiments, the present invention includes an algorithm and technology required for the present invention's operation. In some embodiments, the present invention includes a proprietary algorithm for computing, in real time, vehicle routes that maximize both quality of service and passenger aggregation. In some embodiments, the present invention will include, but is not limited to (1) a customer smartphone app; (2) a van console or tablet that displays route and customer information to drivers; and/or (3) a central control system that processes ride requests, runs the present invention's routing algorithm, and communicates updated routes to vehicles. In some embodiments, all three components will be based on existing, commercially-proven technology.

In some embodiments, the present invention will construct an end-to-end demo to validate the principal features of its solution. In some embodiments, the demo will integrate vehicles equipped with vehicle consoles and passengers wielding the present invention's smartphone app, with a highly realistic computer simulation of the present invention's service. In some embodiments, the "hybrid" demo will allow the present invention to test both the ability of its technology (app, console, central control) to support real-time communication between customers and vans, and the ability, in simulation, of its routing algorithm to efficiently serve thousands of passengers and dispatch hundreds of vans. In some embodiments, to ensure the simulation provides a reliable means for evaluating the present invention's algorithm, it will be designed to faithfully reflect the statistics of passenger demand and transportation dynamics in the city modeled by the demo.

In some embodiments, the present invention includes partnerships with municipalities and local businesses in candidate launch cities, and comprehensively assesses state and city regulatory requirements.

In some embodiments, the present invention will be launched in a succession of measured increments, creating multiple opportunities to test and refine its model, all the while scaling rapidly to exploit its position as the first provider of a novel service. In some embodiments, an evaluation of the price, performance and safety of several vehicle models, and finalize negotiations for the acquisition of its vehicle fleet and launching of a marketing and branding campaign, and conduct market research to inform decisions regarding fares and QoS requirements will occur.

In some embodiments, the present invention will be operated in a trial phase for a period of 2 or more months that includes a 'customer-less' trial phase, the present invention will deploy 20 vehicles throughout Manhattan in New York City. In the embodiment, the vehicles will respond to computer-generated ride requests and allow the present invention to test its technology and operation, and correct major issues before they are exposed to customers.

In some embodiments, the present invention will include a pilot program for 2 or more months where the present invention will operate 5 to 100 vehicles and serve up to 10,000 residents of select local neighborhoods. In some embodiments, service will be limited in coverage, routes, and schedule, but will be provided free of charge or at a reduced cost. In some embodiments, the present invention will utilize this period to further optimize its algorithm, correct any remaining kinks in its service, and begin building brand recognition.

In some embodiments, the present invention will accept subscribers by invitation only, with invitations issued by existing subscribers.

In some embodiments, the present invention's operation will expand to additional cities, calling for the creation of an eco-system of independent van operators. In some embodiments, these 'franchisees' will utilize the present invention's proven technology, dispatch service, and passenger registration and billing services, while sharing revenues with the present invention. In some embodiments, to ensure exceptional quality of service is maintained by all operators, the present invention will define detailed requirements that operators must follow, from vehicle appearance to driver training.

In some embodiments the present invention will be designed to adhere to local and national regulatory guidelines. In some embodiments, the present invention is a congestion-reducing, eco-friendly service. In some embodiments, the present invention's vans will not idle for long in one place because passenger pick-up/drop-off is not expected to exceed 30 seconds.

In some embodiments, the present invention's vehicle-routing algorithm represents a complex algorithmic problem. In some embodiments, the present invention's analytical solution of its model offers initial validation for the idea that several hundred vehicles can efficiently aggregate thousands of passengers while providing high quality of service.

In some embodiments, driver performance is part of the present invention's service. In some embodiments, drivers are the face of the company, are responsible for safety, and can significantly impact vehicles' timeliness and customers' overall experience of the present invention's service. In some embodiments, the present invention includes drivers with incentive-based compensation and trained drivers.

In some embodiments, the present invention is configured to ensure that customers experience outstanding service throughout their interaction with the present invention: using the smartphone app to request a ride, receiving vehicle arrival-time updates, vehicles' external and internal appearance, pick-up and drop-off, the time spent on board the vehicle, billing, providing feedback and all other communication.

In some embodiments, the present invention's transportation solution creates an infrastructure, or 'eco-system', for efficient, affordable transportation that responds to passenger demand in real time. In some embodiments, this eco-system is compatible not only with the present invention's vehicles, but also with vehicles operated by independent vehicle operators and/or by franchisees. In some embodiments, in the independent operator/franchisee model, the independent operators/franchisees provide the vehicles and drivers. In some embodiments, the model is highly flexible and scalable: owner/drivers of a single vehicle and operators of multi-vehicle fleets can participate in this eco-system, and franchises for entire cities can be granted to franchisees. In some embodiments, the present invention's 'eco-system' is not limited to vans and may include all commercial (e.g. taxis, livery cars, limos, and SUVs) and non-commercial vehicles (e.g. private cars) that can utilize the present invention's infrastructure to provide transportation that responds to passenger demand in real time.

In some embodiments, the present invention's model is applicable not only in dense, urban markets, but can also be adapted to suburban and inter-city/state (e.g. highway) transportation. In some embodiments, the vehicles of the present invention will be associated with a unique 'name'—when passengers receive pick-up confirmation, they will also be informed of a method for identifying their vehicle (for example, the name of their vehicle). In some embodiments, the passengers can identify their vehicle based, at least in part, on one or more visible feature of the vehicle. In some embodiments, the visible features may include a sign positioned in a window of the vehicle. In some embodiments, the signs are colored. In some embodiments, the system may include a visual cue-based system.

In some embodiments, the passengers of the present invention will be encouraged to 'check in' when on board one of the vehicles of the present invention. In some embodiments, the passenger who checks in most frequently on any one van will be declared the "owner" of that van, and will be entitled to (re)name the van.

In some embodiments, the lighting in vans ('mood lighting') will be carefully calibrated to achieve a pleasant and relaxing travel experience. In some embodiments, the fare pricing options may include, but are not limited to, fixed by (pre-defined) zone, fixed by distance/time, fixed by time of day (e.g. rush hour vs. non-rush hour), and/or varies in real time as a function of demand.

In some embodiments, for customers not equipped with a smartphone, reservation by SMS will be available. In some embodiments, the present invention will allow tourists/business travelers to set up an account through their hotel, or to use their hotel's account related to the present invention.

In some embodiments, in addition to WiFi and a small workspace, the vans or other vehicles of the present invention will also offer power outlets for laptops, cell phones, iPods®, etc.

In some embodiments, the vans will be stocked with refreshments and snacks that customers can purchase using their smart phone app, which may be fully automated.

In some embodiments, the billing options include, but are not limited to, payment at the time of purchase (of single ride, weekly or monthly pass); prepaid packages (potentially discounted relative to single-ride fares); and/or weekly/monthly billing, for trips taken during the preceding week/month.

In some embodiments, passengers requesting a ride and accepting the present invention's schedule estimate and fare, will receive a confirmation message and barcode to their phone. In some embodiments, passengers will be required to scan the barcode on their phone when boarding their van.

In some embodiments, the present invention's smartphone app will incorporate a feature for real-time comparisons with existing public transportation options (e.g. bus, train, or subway), listing estimated travel time and cost of travel with these alternatives.

In some embodiments, the present invention may include seat assignments on the van.

In some embodiments, the present invention may include a reduced fare for passengers willing to accept a pick-up/drop-off location that is further from their desired origin/destination than is typical for the service provided by the present invention (e.g. one or two blocks away).

In some embodiments, the present invention may include a routing algorithm that may involve passenger transfers between vans. In some embodiments, the present invention may include a website that will provide customers with detailed information and statistics on the present invention's overall and individual (i.e. passenger-specific) past performance (e.g. wait times, detour durations, adherence to pick-up/drop-off time estimates, etc.).

In some embodiments, the present invention includes a rider application. In some embodiments, the rider application is a mobile phone application for an iPhone, Android or other applicable device. In some embodiments, the rider application is the means by which customers communicate with a company providing the present invention in order to set up and manage their account, request rides, receive updates about ride status and payments, and rate the quality of their ride. In some embodiments, usage of the application falls into a few categories that includes, but are not limited to, 1) on first use, users must set up an account or sign into an existing one; and 2) on subsequent uses, users can request a ride and/or manage their account and see their balance.

In some embodiments, the rider application is used on a modem smartphone such as an Android or iPhone with the following capabilities: Mobile Internet, Rough location sensor (GPS or otherwise), and/or Full English keyboard In some embodiments, the rider application design includes the following guidelines: all data lives "in the cloud"—the authoritative copy is on the server; network usage is minimized for performance reasons; APIs will be implemented in a space-efficient manner; sensitive data will be encrypted for transfer; and APIs will be defined by the server-side.

In some embodiments, all customer data will live "in the cloud"—when the app collects or stores customer data it acts only as a frontend for the servers online. In some embodiments, the network usage should be minimized to avoid incurring overage fees for users and, more importantly, so that the application will be responsive. In some embodiments, it will be useful to store customer data locally (on the phone) for caching purposes, but the data "in the cloud" will always be considered authoritative. In some embodiments, all sensitive data must be sent over an encrypted connection (SSL or otherwise) regardless of direction (up or down). In some embodiments, most (if not all) data will be considered sensitive and so bloat in payload size due to encryption is another reason to minimize network usage. In some embodiments, APIs for communicating between the client (application) and server must be implemented in a space-efficient manner (using, for example, Google's Protocol Buffers).

In some embodiments, the user's interaction with the application follows a mostly-linear flow that includes, but is not limited to, launch, application tutorial (on first use only), login or account creation (if needed), ride ordering, ride details and preparing for arrival, on-van and preparing for departure, and/or notification of charges and summary. In some embodiments, the overall flow, along with the corner cases are described graphically in FIG. 5.

Figure 5:
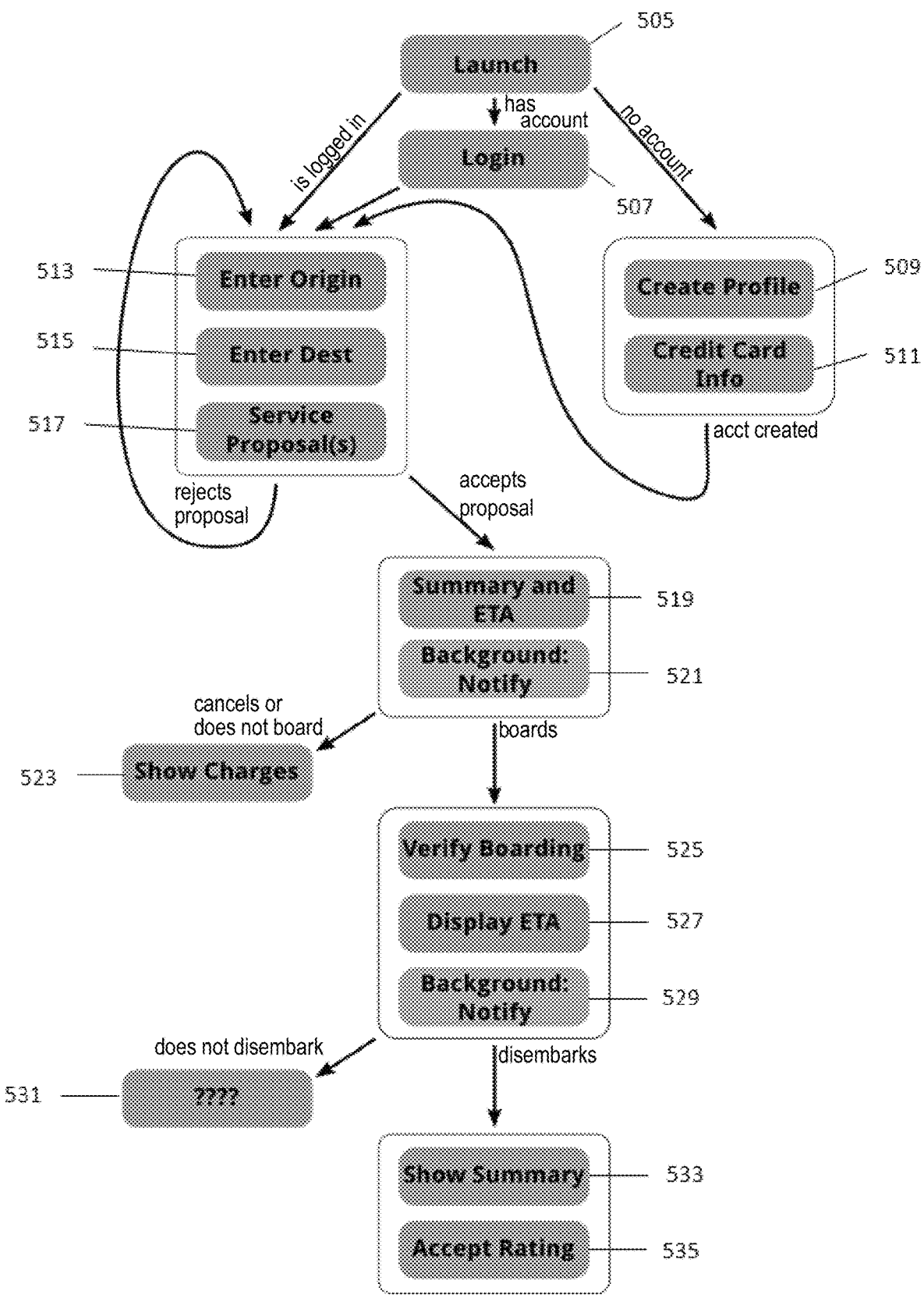
FIG. 5 illustrates features of some embodiments of the present invention.
Figure 7A:
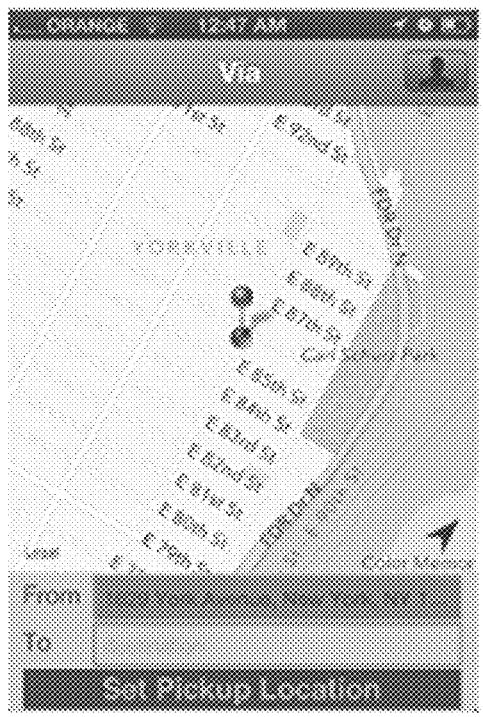
FIGS. 7A-7B illustrate screen shots of some embodiments of the present invention.
Figure 7B:
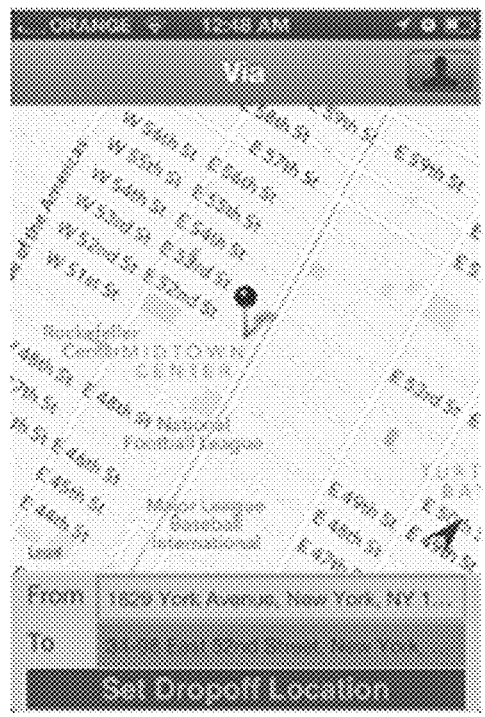
Figure 8A:
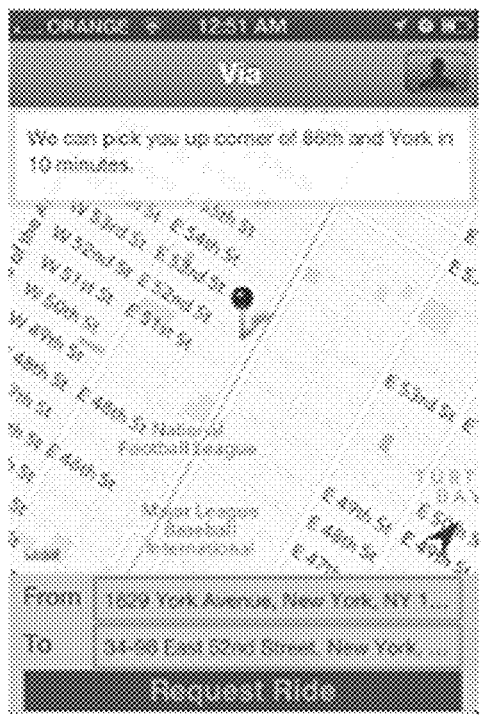
FIGS. 8A-8B illustrate screen shots of some embodiments of the present invention.
Figure 8B:
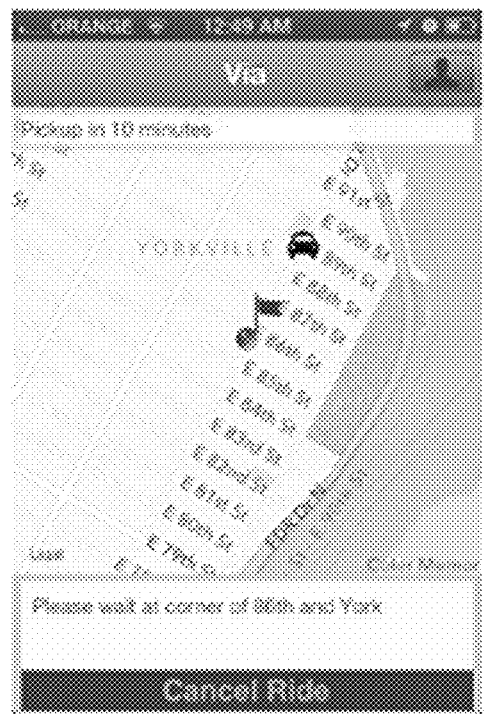
Figure 9A:
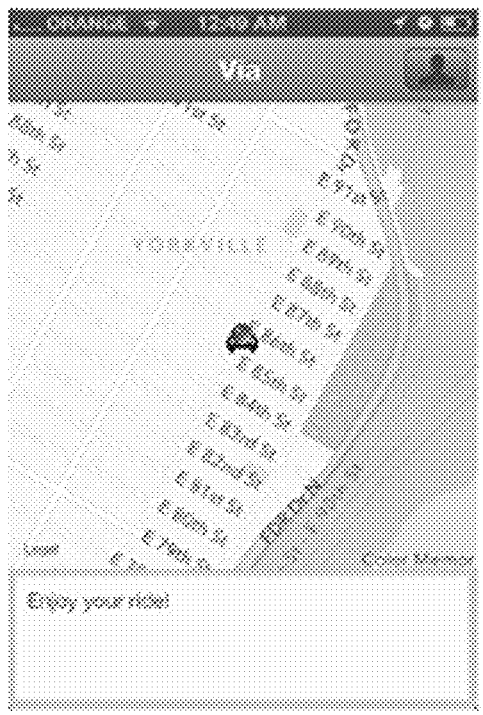
FIGS. 9A-9B illustrate screen shots of some embodiments of the present invention.
Figure 9B:
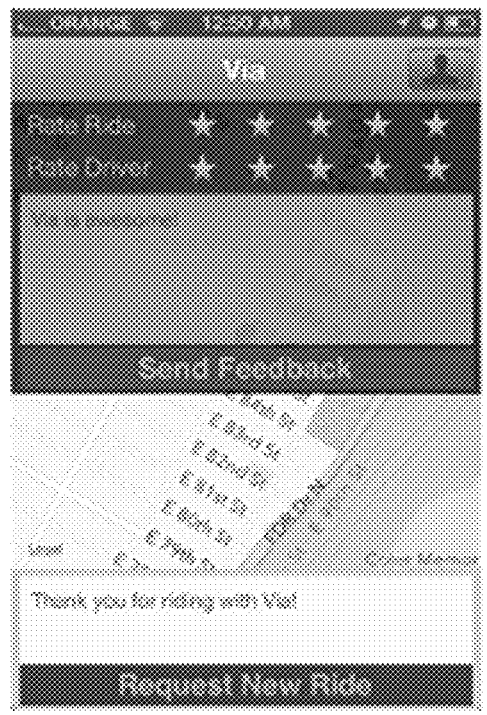

In some embodiments, the overall flow shown on FIG. 5 includes launch 505. In an embodiment, if a user has an account, the user continues to login 507. In the embodiment, if the user has no account, the user continues to create a profile 509 and provide credit card information 511. In the embodiment, after the login 507, provide credit card information 511, or if the user is already logged in, the user continues to enter an origin 513, enter a destination 515 and receives one or more service proposals 517. In the embodiment, if the user rejects the proposal, steps 513, 515, and 517 are repeated until the user accepts the proposal.

In the embodiment, after the user accepts the proposal, a summary of the proposal and an estimated time of arrival 519 is provided. In the embodiment, the user is then notified of boarding 521. In the embodiment, if the user cancels or does not board, the user is shown charges 523. In the embodiment, if the user boards, the boarding is verified 525, an estimated time of arrival is displayed 527 and the user is notified 529.

In the embodiment, if the user does not disembark from the vehicle after arrival, the user is queried 531 to assess why they have not departed. In the embodiments, if the user disembarks from the vehicle, the summary of the trip 533 is shown and the accept rating step 535 is then completed.

In some embodiments, the application may include an introductory tour explaining the use of the present invention. In some embodiments, the tour is 4 slides or less. In some embodiments, the present invention does not include a tour.

In some embodiments, the initial account setup will include a signup that will serve to collect all the information required to interact with the customer and bill them for rides. In some embodiments, at signup, the following may be collected: the user's full name; phone number; password/pin; e-mail; and/or credit card information such as type, number, expiration, cvv number. In some embodiments, the user may also provide preferred name (nickname); photo of the user from the phone's camera/gallery; a pre-payment—users may pre-pay for rides for a bonus; and/or a promotional code. In some embodiments, the photo and nickname may be used to help verify that they were picked up and to personalize the app.

In some embodiments, after entering their account details, users are shown "terms of service" agreement and disclaimer, including, but not limited to privacy policy statement on use and storage of data and/or legal indemnification language.

In some embodiments, the users must accept these terms of service in order to finalize account creation.

In some embodiments, the user may sign up with the service of the present invention using a Facebook account. In some embodiments, the signup using Facebook API may include the following information: their preferred (not legal) name; where they live; their profile photo; their friend list; and/or an e-mail address (might be a proxy for their real address).

In some embodiments, users will be able to invite their friends to join them in using the present invention. In some embodiments, the users get some incentive (bonus rides, etc.) for doing so or some limit on invites for an invite-only service. In some embodiments, friends can be invited individually, by SMS/e-mail, or by entering a phone number or e-mail in the application; in bulk using Facebook account; and/or by getting API access to their Facebook friends.

In some embodiments, present invention includes account management. In some embodiments, after the initial signup, users will be able to edit their account details. In some embodiments, all personal data (e-mail, phone number, nickname, password/pin, photo etc.) will be editable from within the application. In some embodiments, users will be able to enter promotional codes. In some embodiments, users will be able to store a list of favorite locations and manage them (add, edit remove).

In some embodiments, users will be able to add or remove credit cards for billing purposes. In some embodiments, multiple credit cards may be associated with a single account. In some embodiments, cards can be categorized as personal/business. In some embodiments, users will be able to add stored value (pre-payments) to their account. In some embodiments, users will be able to set up recurring/automatic payments on their account.

In some embodiments, the authoritative copy of all personal details will live on the server and the application may cache those details for performance reasons as needed.

In some embodiments, users of the application will be able to view a history of their recent rides and view their current balance (both for the current billing cycle). In some embodiments, each entry in the list of recent ride requests may include, but is not limited to, date and time of ride request; whether the ride was cancelled; if not cancelled: length of ride; driver name; origin and destination of trip; user's rating of the ride (if given at the time of the ride); and/or the amount charged for the ride or cancellation.

In some embodiments, these historical data will be loaded from the remote server and need not be cached. In some embodiments, it is not important that they load very quickly.

In some embodiments, in order to request a ride, the rider will provide the following information: their current location; their desired destination; and/or the number of people they are travelling with.

In some embodiments, it is useful to know the location of the riders' origin and destination with high precision because the side of the street on which they are located can affect how/where the present invention picks them up and how much they need to walk to the pickup. In some embodiments, when users enter their pickup location, they may correct the position given by the GPS/network; and/or choose one of their stored favorite locations as a destination. In some embodiments, when the users select their destination, they may choose of their stored favorite locations as a destination; search for a specific address; and/or search for a place name.

In some embodiments, if there are multiple results for a particular address/place query, the application will disambiguate between them.

In some embodiments, when riders set a new location as their origin or destination, they will be able to easily store that location as a favorite location. In some embodiments, once the origin, destination and number of passengers are fixed, users receive a proposal of service that may be fetched from the server. In some embodiments, the proposal includes, but is not limited to, the point of pickup, which may not be directly at the user's current location; potentially use local businesses/landmarks to direct people; the approximate pickup time, which may be a few minutes hence; a time estimate for the ride (range); and/or the price of the ride.

In some embodiments, the rider can see the point of pickup at high resolution—they may need to be at particular corner of a 4-way intersection for the pickup.

In some embodiments, the present invention will propose 1-3 possible rides with different pickup times and the user chooses between them. In some embodiments, the present invention will propose 1-5 possible rides with different pickup times and the user chooses between them. In some embodiments, the present invention will propose 1 possible rides with different pickup times and the user chooses between them. In some embodiments, the present invention will propose 2 possible rides with different pickup times and the user chooses between them. In some embodiments, the present invention will propose 3 possible rides with different pickup times and the user chooses between them. In some embodiments, the present invention will propose 1-10 possible rides with different pickup times and the user chooses between them. In some embodiments, the present invention will propose greater than 10 possible rides with different pickup times and the user chooses between them.

In some embodiments, the proposal screen will echo the users' origin and destination points so that they can be confident that they ordered the ride they intended to. In some embodiments, users can choose to; order the ride; pick a particular ride offer; and/or cancel the request entirely.

In some embodiments, the user needs to make this choice within 30 seconds or the proposals are invalidated. In some embodiments, if they cancel the request, they return to the beginning.

In some embodiments, if the user orders a particular ride, then a summary of service will be displayed which may include, but is not be limited to, identifying information about the van and driver picking them up identifying color and name displayed on the van; some handshake (clever call-response/joke, barcode) with driver; a map displaying the user's current location according to GPS/network, the pickup location of the ride they ordered, the van's location; and/or potentially the van's route; a continuously updating estimate of the time until van arrival (pickup); a way to cancel the ride request and whether the cancellation costs money and how much; and/or walking directions to the point of pickup.

In some embodiments, identifying information about the van and driver (name, photo) are displayed to ensure that they board on the correct van. In some embodiments, the cancellation button/interface will make it clear if/when cancellation costs them money. In some embodiments, this may include a pop-up that explains cancellation policy.

In some embodiments, rides may arrive at the select location several minutes in the future. In some embodiments, it is important to remind users to leave in advance of the ride and to direct them to the point of pickup. In some embodiments, the pickup will be displayed at high resolution on the phone; the user will be notified several minutes before van arrival; and/or the user will be notified on van arrival as well; the estimated van arrival time will update continuously.

In some embodiments, it is important that riders board the correct van. In some embodiments, with good enough network/location service, the app will detect when users board the van (might also use the 'hand shake' described above). In some embodiments, once detected that they have boarded, the user will be notified. In some embodiments, if the rider does not board the van, the application will notify them of any charges associated with a missed ride; notify them of any options they have (e.g. taking another nearby van); and/or potentially allow them to contest those charges.

In some embodiments, when a rider is aboard a van or other vehicle, the application will notify the rider of an impending dropoff and/or show an estimated time of arrival such as ETA given approximately—5-7 minutes, 14-17 minutes, or other time range.

In some embodiments, the driver will notify the rider of the dropoff.

In some embodiments, the system will detect when a rider has left the van in one or more of the following ways: the driver will indicate that she has dropped off the rider; the present invention detects that the van has stopped at the rider's intended destination; and/or the present invention detects, using location information from the rider's location mobile device, that they have left the van.

In some embodiments, upon disembarking, users will then receive a notification. In some embodiments, the notification screen should include, but is not limited to, a "thank-you"; the name and picture of the driver; the ability to rate the driver; the ability to rate the ride quality; and/or ability to comment on ride quality.

In some embodiments, the application will include, but is not limited to the following features: walking directions from the current location to the pickup location and from the dropoff location to the requested destination; and/or an option for additional tipping of the driver beyond the default tip.

In some embodiments, high-level examples of the account creation, ride ordering procedure, information displayed during the ride, and post-ride feedback screen are shown in FIGS. 6A-6C (account creation), 7A (setting pickup location) and 7B (setting dropoff location), 8A (accepting the ride offer) and 8B (waiting for the ride), and 9A (pick-up—during the ride) and 9B (dropped-off—post-ride).

Figure 10:
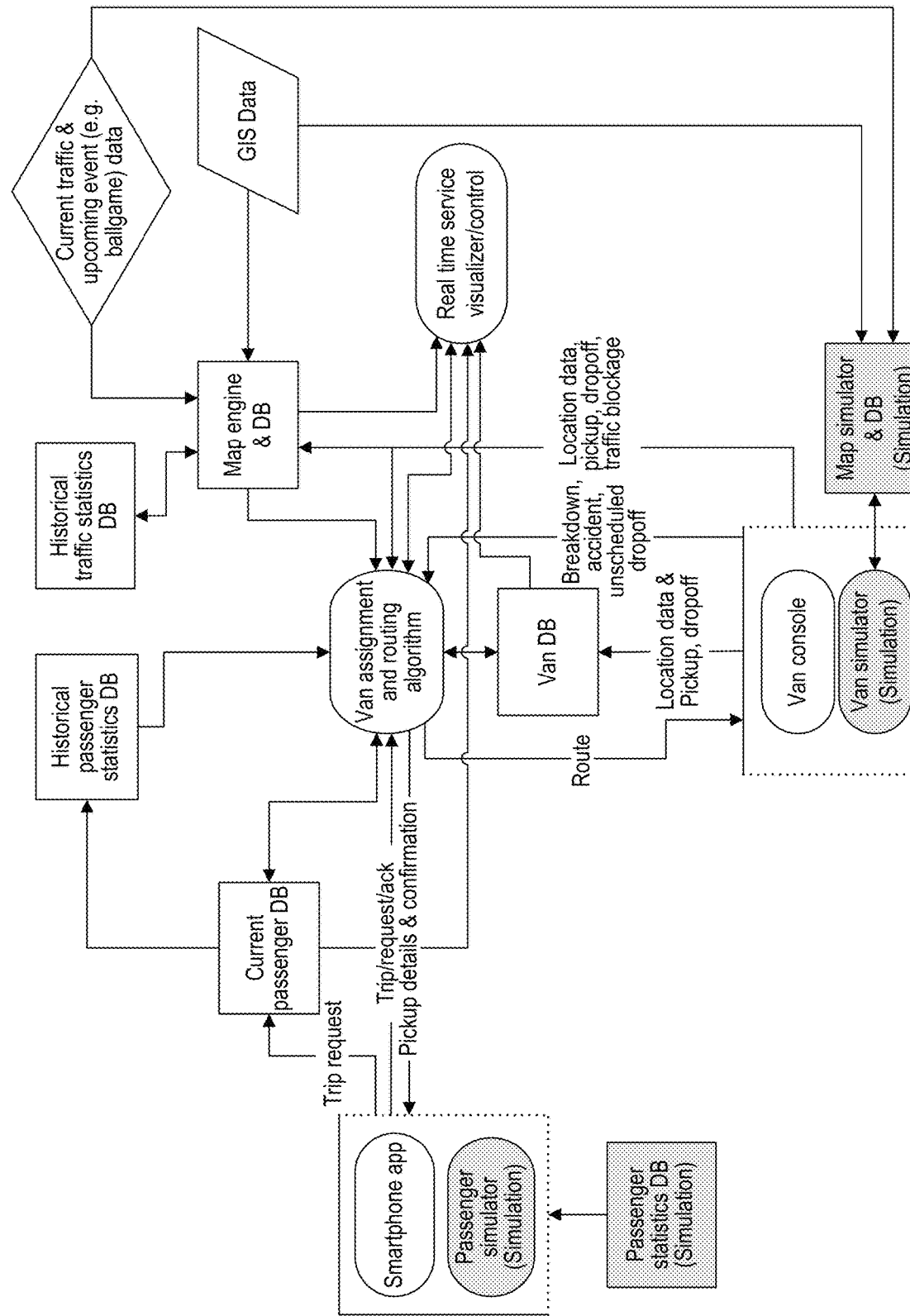
FIG. 10 illustrates features of some embodiments of the present invention.

In some embodiments, the system architecture is shown in FIG. 10. In some embodiments, the historical passenger statistics database shown in FIG. 10 logs the information surrounding a member's ride: time of request/booking, number of passengers, origin, destination, ride status (completed, canceled, didn't show, etc.). In a non-limiting example, if a traveler attempted to request a ride from the Upper East Side (where service is currently offered) to New Jersey (where service may not be offered), a traveler would receive an error in the app; however, the system would still log the attempted ride the traveler attempted to book.

In some embodiments, this data gives dimension to a particular member's riding habits. In some embodiments, this information may be useful for understanding information like retention. In some embodiments, the data is also important because it allows the system to map where people ride to/from and at what times those rides and requests happen. In some embodiments, once analyzed, the data may drive a predictive component to the algorithm of the present invention that could provide supply to a particular area just prior to when a predicted demand increase occurs in that located based on historical data.

In some embodiments, the Historical traffic statistics database includes a static traffic layer that sits "on top" of the mapping engine. In the embodiment, the traffic layer determines how fast a vehicle can travel on each street. In a non-limiting example, Park Ave. between 72nd and 92nd may move on average at 7 m/s, but Park Ave. between 71st and 59th may on average move at 3 m/s. In the embodiment, the speeds factor into the algorithm and contributes, at least in part, to the estimated time of arrival(s) provided to one or more members when a ride is requested. In some embodiments, the speed on a street is a component of determining how the distance a car is from a member and how a vehicle can get to that member.

In some embodiments, because each driver uses an iPad Mini or equivalent during service, the present invention can also use GPS data from a driver app installed on each of the iPad Mini or equivalent device to source traffic data. In an embodiment, a dynamic model of traffic information associated with one or more travel areas is developed. In a non-limiting example, the longer the service, the more traffic information on a specific location such as Manhattan the system receives and thus, over time, the traffic model improves. In some embodiments, the model may have granularity down to a block level and have different average speeds for different days of the week and times of the day. In some embodiments, the present invention may include a real-time traffic solution based, at least in a part, on a number of vehicles covering a particular city at a given time.

In some embodiments, the current traffic & upcoming event data may include a real-time traffic source feeding into the mapping engine to optimize the routing. In an non-limiting example, if traffic is at a standstill on 83rd St. because a police blockade is not permitting through travel, the system will provide real-time information to the map. In the non-limiting example, the map would then make travel along 83rd St. much more "costly" for the algorithm, which in turn would avoid routing vehicles along the blocked part of 83rd St.

In some embodiments, upcoming event data such as Madison Square Garden's event schedule may be collected for use in the algorithm. In some embodiments, the event information may be used, based on the location of the event, to discount or incentivize travel along certain routes near the event if the traffic will be better or worse based on historical data associated with the event and/or as an additional predictive component for demand and over-supply vehicles near the event in anticipation of increased demand for service.

Illustrative Operating Environments

Figure 11:
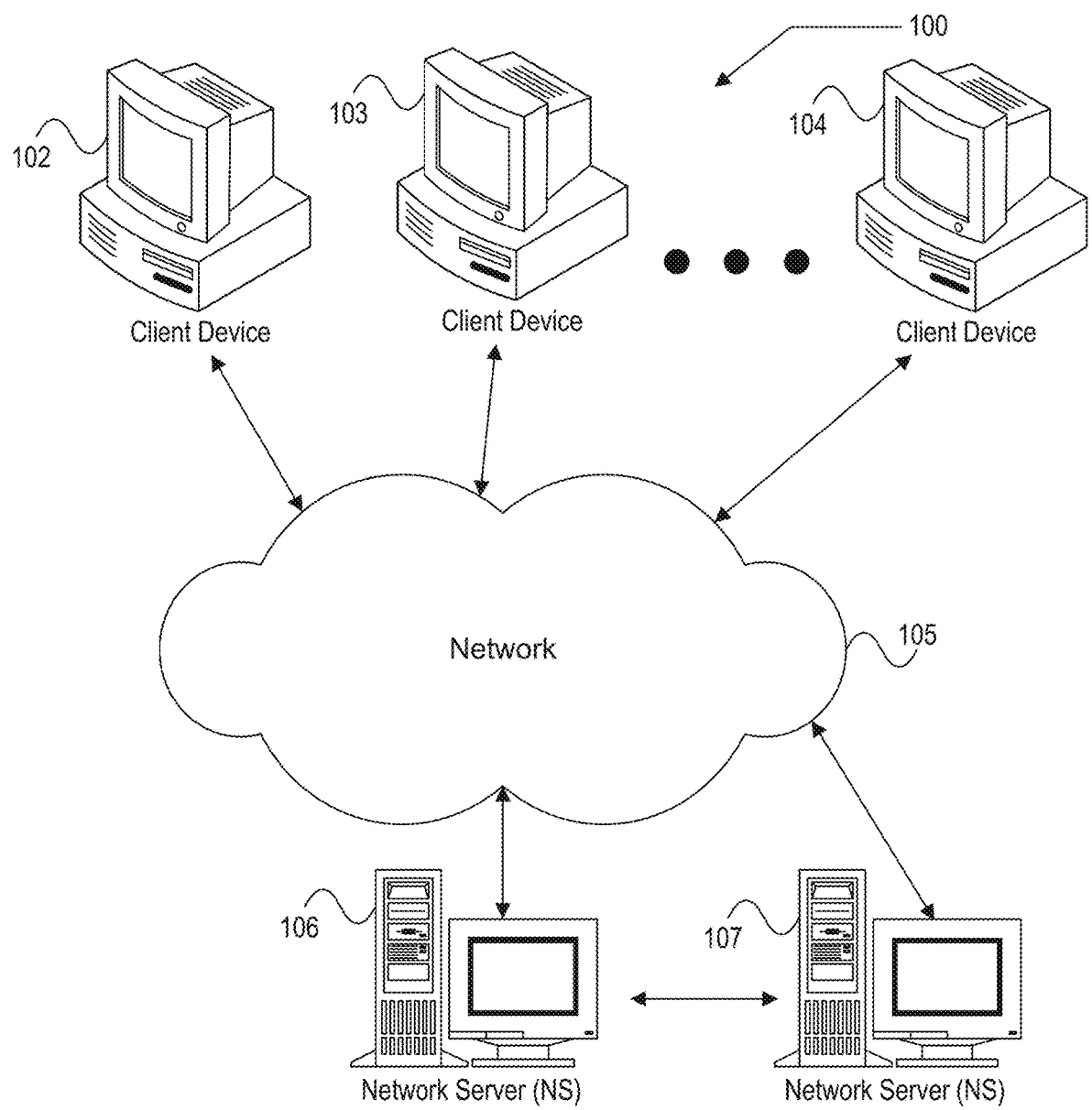
FIG. 11 illustrates features of some embodiments of the present invention.

FIG. 11 illustrates one embodiment of an environment in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In other embodiments, the inventive system and method are based on a scalable computer and network architecture that incorporates various strategies for assessing the data, caching, searching, and database connection pooling. An example of the sealable architecture is an architecture that is capable of operating multiple servers.

In embodiments, members of the inventive computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, digital tablets, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In other embodiments, each member device within member devices 102-104 may include a mobile or smart phone application. In embodiments, the browser or mobile application may be configured to receive and display graphics, text, multimedia, and the like. In embodiments, the browser application may employ virtually any web based language, including, but not limited to Standard Generalized Markup Language (SGML), such as HyperText Markup Language (HTML), a wireless application protocol (WAP), a Handheld Device Markup Language (HDML), such as Wireless Markup Language (WML), WMLScript, XML, JavaScript, and the like. In embodiments, the mobile application may be programmed in virtually any suitable programming language, including, but not limited to Objective C, Python, Java, C++, C#. In embodiments, the invention is programmed in either Java, .Net, QT, C, C++, Python, Javascript or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 12:
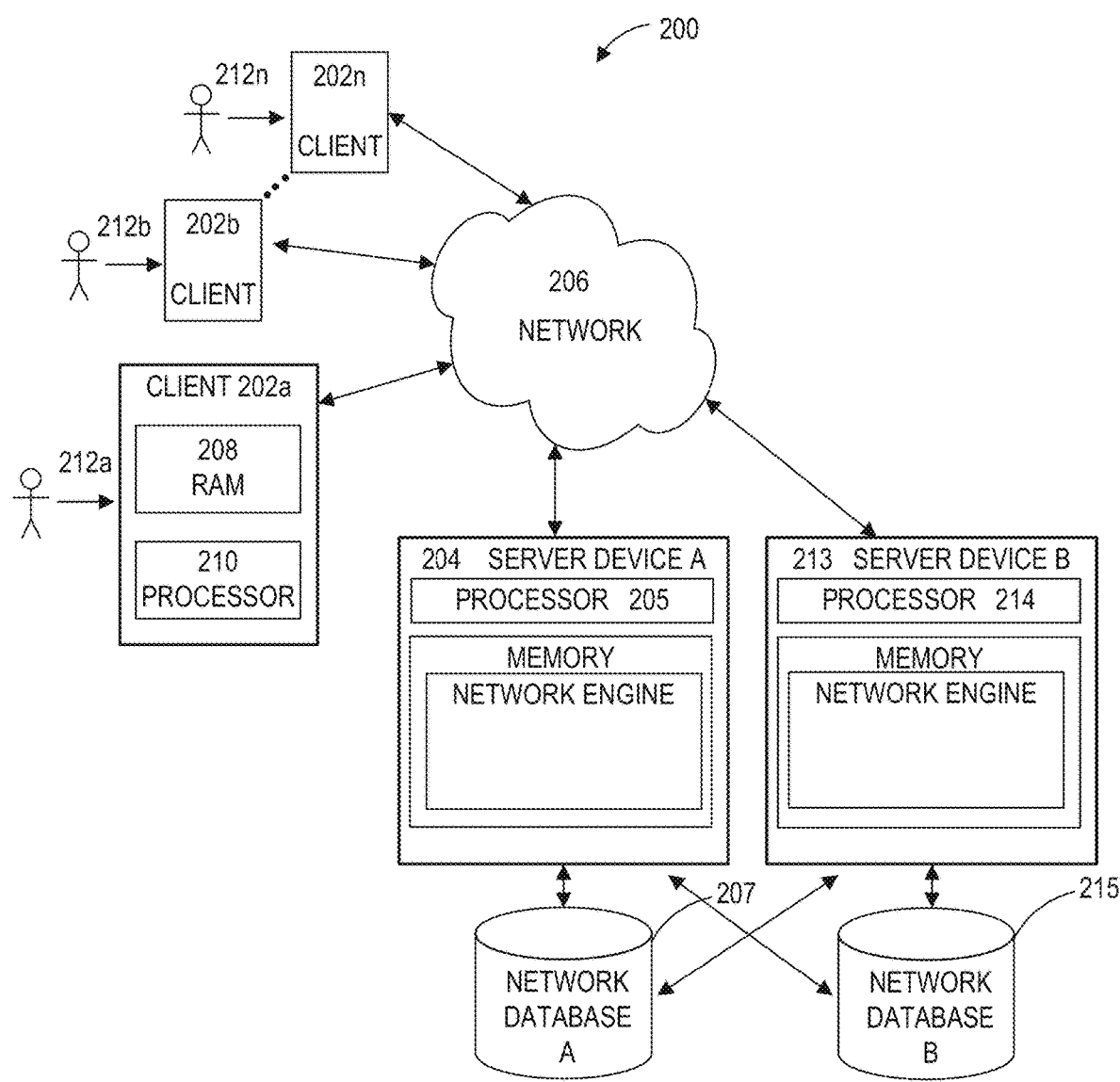
FIG. 12 illustrates features of some embodiments of the present invention.

FIG. 12 shows another exemplary embodiment of the computer and network architecture that supports the inventive method and system. The member devices 202a, 202b thru 202n shown each at least includes a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, solid-state drive, USB drive, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, Mac OS X, or Linux. Client devices 202a-n may operate on any mobile operating system, such as iOS, Android, Windows, or BlackBerry OS. The client devices 202a-n shown may include, for example, personal computers executing a browser application program such as Microsoft Corporation's Internet Explorer™, Apple Computer, Inc.'s Safari™, Mozilla Firefox, Google Chrome, and Opera. Through the client devices 202a-n, users (e.g. players, agents, etc.) 212a-n communicate over the network 206 with each other and with other systems and devices coupled to the network 206. As shown in FIG. 12, server devices 204 and 213 may be also coupled to the network 206.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, iPhone®, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, address, landmark, business, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tapped," or otherwise moved in close proximity to communicate. In some Embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

The invention claimed is:

1. A system for providing multiple transportation proposals to a user, the system comprising:
   a communication interface configured to:
      receive a travel request from a first user via a wireless mobile processor-based device, the travel request including a starting location, a desired destination, and a number of one or more passengers to be transported; and
      receive, from a plurality of wireless communication devices associated with a plurality of transportation vehicles, Global Positions Systems (GPS) data indicative of current locations of the plurality of transportation vehicles; and
   at least one processor configured to:
      identify a first vehicle currently transporting a first plurality of passengers that can additionally transport the first user;
      calculate a route for the first vehicle based on the desired destination of the first user, a plurality of destination locations of the first plurality of passengers in the first vehicle, and the number of the one or more passengers to be transported associated with the travel request from the first user;
      calculate a first estimated pick-up time based on a first current location of the first vehicle indicated in GPS data received from the first vehicle and the starting location of the first user indicated in the travel request;
      determine a first proposal associated with the first vehicle, wherein the first proposal includes the first estimated pick-up time and a pick-up location;
      identify a second vehicle currently transporting a second plurality of passengers that can additionally transport the first user;
      calculate a route for the second vehicle based on the desired destination of the first user, a plurality of destination locations of the second plurality of passengers in the second vehicle, and the number of the one or more passengers to be transported associated with the travel request from the first user;
      calculate a second estimated pick-up time based on a second current location of the second vehicle indicated in GPS data received from the second vehicle and the starting location of the first user indicated in the travel request;
      determine a second proposal associated with the second vehicle, wherein the first proposal and the second proposal are associated with the same pick-up location and the second proposal includes the second estimated pick-up time, wherein the second estimated pick-up time is different from the first estimated pick-up time;
      provide information associated with the first proposal and the second proposal to the first user, thereby enabling the first user to select between the first proposal and the second proposal;
      receive from the first user via the wireless mobile processor-based device a proposal selection reflective of a selected pick-up vehicle;
      assign, based on the received proposal selection, the selected pick-up vehicle to pick-up the first user;
      provide to the wireless mobile processor-based device information to cause walking directions to be displayed to the first user to direct the first user to the pick-up location; and
      redirect the selected pick-up vehicle to pick up the first user at the pick-up location, wherein the pick-up location is a corner nearest to the starting location of the first user.

2. The system of claim 1, wherein the information provided to the first user includes a first time range associated with the first estimated pick-up time and a second time range associated with the second estimated pick-up time.

3. The system of claim 1, wherein the information provided to the first user includes a first indication of an estimated travel time in the first vehicle and a second indication of an estimated travel time in the second vehicle.

4. The system of claim 1, wherein the information provided to the first user includes a first proposed price associated with the first vehicle and a second proposed price associated with the second vehicle.

5. The system of claim 1, wherein the at least one processor is further configured to assign, after the selected pick-up vehicle picked up the first user, the selected pick-up vehicle to pick up a second user at another pick-up location while the first user is still riding in the selected pick-up vehicle, wherein a desired destination of the second user is other than the desired destination of the first user.

6. The system of claim 1, wherein the at least one processor is further configured to: determine at least one more proposal; and
   provide the first user information about the first proposal, the second proposal, and the at least one more proposal to the first user.

7. The system of claim 1, wherein the at least one processor is further configured to invalidate the first and second proposals if the first user does not make a proposal selection within a predefined period of time.

8. The system of claim 1, wherein the at least one processor is further configured to provide to the wireless mobile processor-based device a summary of the selected proposal and an estimated time of arrival of the selected pick-up vehicle.

9. The system of claim 8, wherein the at least one processor is further configured to: continuously update the estimated time of arrival of the selected pick-up vehicle; and notify the first user before the selected pick-up vehicle arrives.

10. The system of claim 1, wherein the at least one processor is further configured to provide to the wireless mobile processor-based device information to cause walking directions to be displayed to the first user to direct the first user from a drop-off location other than the desired destination to the desired destination.

11. The system of claim 1, wherein the at least one processor is further configured to identify a vehicle that can pick up the first user based on: the starting location of the first user, a current location of the vehicle, a current number of passengers in the vehicle, and a current route associated with the vehicle.

12. The system of claim 1, wherein the at least one processor is further configured to calculate a route for the selected pick-up vehicle based on a current number of passengers in the selected pick-up vehicle and each of their corresponding destination locations.

13. The system of claim 1, wherein the at least one processor is further configured to calculate a route for the selected pick-up vehicle further based on historic traffic conditions.

14. The system of claim 1, wherein the at least one processor is further configured to calculate the route for the first vehicle further based on real time traffic conditions.

15. The system of claim 1, wherein the at least one processor is further configured to: determine a first drop-off location at a location having minimal impact on an overall travel time of the first plurality of passengers in the first vehicle; and
use the communication interface to communicate an updated route to a driver of the first vehicle.

16. A method for providing multiple transportation proposals to a user, the method comprising:
receiving a travel request from a first user via a wireless mobile processor-based device, the travel request including a starting location, a desired destination, and a number of one or more passengers to be transported;
receiving, from a plurality of wireless communication devices associated with a plurality of transportation vehicles, Global Positions Systems (GPS) data indicative of current locations of the plurality of transportation vehicles;
identifying a first vehicle currently transporting a first plurality of passengers that can additionally transport the first user;
calculating a route for the first vehicle based on the desired destination of the first user, a plurality of destination locations of the first plurality of passengers in the first vehicle, and the number of the one or more passengers to be transported associated with the travel request from the first user;
calculating a first estimated pick-up time based on a first current location of the first vehicle indicated in GPS data received from the first vehicle and the starting location of the first user indicated in the travel request;
determining a first proposal associated with the first vehicle, wherein the first proposal includes the first estimated pick-up time and a pick-up location;
identifying a second vehicle currently transporting a second plurality of passengers that can additionally transport the first user;
calculating a route for the second vehicle based on the desired destination of the first user, a plurality of destination locations of the second plurality of passengers in the second vehicle, and the number of the one or more passengers to be transported associated with the travel request from the first user;
calculating a second estimated pick-up time based on a second current location of the second vehicle indicated in GPS data received from the second vehicle and the starting location of the first user indicated in the travel request;
determining a second proposal associated with the second vehicle, wherein the first proposal and the second proposal are associated with the same pick-up location, and the second proposal includes the second estimated pick-up time, wherein the second estimated pick-up time is different from the first estimated pick-up time;
providing information associated with the first proposal and the second proposal to the first user, thereby enabling the first user to select between the first proposal and the second proposal;
receiving from the first user via the wireless mobile processor-based device a proposal selection reflective of a selected pick-up vehicle; and
assigning, based on the received proposal selection, the selected pick-up vehicle to pick up the first user;
causing walking directions to be displayed to the first user to direct the first user to the pick-up location; and
redirecting the selected pick-up vehicle to pick up the first user at the pick-up location, wherein the pick-up location is a corner nearest to the starting location of the first user.

17. The method of claim 16, wherein the information provided to the first user includes at least one of: (i) a first time range associated with the first estimated pick-up time and a second time range associated with the second estimated pick-up time; (ii) a first indication of an estimated travel time in the first vehicle and a second indication of an estimated travel time in the second vehicle, or (iii) a first proposed price associated with the first vehicle and a second proposed price associated with the second vehicle.

18. The method of claim 16 further comprising: assigning, after the selected pick-up vehicle picked up the first user, the selected pick-up vehicle to pick up a second user at another pick-up location while the first user is still riding the selected pick-up vehicle, wherein a desired destination of the second user is other than the desired destination of the first user.

19. The method of claim 18 further comprising: calculating a route for the selected pick-up vehicle based on the desired destination of the first user and the desired destination of the second user.

20. The method of claim 16 further comprising: providing to the wireless mobile processor-based device information to cause walking directions to be displayed to the first user to direct the first user from a drop-off location other than the desired destination to the desired destination.

21. The method of claim 16, wherein the first proposal associated with the first vehicle and the second proposal associated with the second vehicle are invalidated if the first user has not selected a proposal within a predetermined period of time.

* * * * *